United States Patent
Takazawa

(10) Patent No.: US 10,623,241 B2
(45) Date of Patent: Apr. 14, 2020

(54) NETWORK DEVICE AND METHOD THEREFOR

(71) Applicant: CANON KABUSHIKI KAISHA, Tokyo (JP)

(72) Inventor: Satoshi Takazawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/893,234

(22) Filed: Feb. 9, 2018

(65) Prior Publication Data

US 2018/0234292 A1    Aug. 16, 2018

(30) Foreign Application Priority Data

Feb. 16, 2017  (JP) ................. 2017-027293

(51) Int. Cl.
| | |
|---|---|
| *H04L 12/24* | (2006.01) |
| *G06F 3/12* | (2006.01) |
| *H04W 84/12* | (2009.01) |
| *G06F 8/65* | (2018.01) |

(52) U.S. Cl.
CPC ......... *H04L 41/0803* (2013.01); *G06F 3/123* (2013.01); *G06F 3/1204* (2013.01); *G06F 3/1291* (2013.01); *H04L 41/0266* (2013.01); *H04L 41/0806* (2013.01); *G06F 8/65* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,735,630 B1 * | 5/2004 | Gelvin | B60R 25/1004 706/33 |
| 2003/0095500 A1 | 5/2003 | Cao | |
| 2010/0315670 A1 | 12/2010 | Kojima | |
| 2014/0123123 A1 | 5/2014 | Bahls | |
| 2016/0234678 A1 * | 8/2016 | Baum | H04W 48/08 |
| 2019/0020730 A1 * | 1/2019 | Singamsetty | H04L 67/34 |

FOREIGN PATENT DOCUMENTS

| | | |
|---|---|---|
| CN | 1696905 A | 11/2005 |
| CN | 101433018 A | 5/2009 |
| JP | 2007-157086 A | 6/2007 |
| JP | 2016-110339 A | 6/2016 |

* cited by examiner

*Primary Examiner* — Robert M Morlan
(74) *Attorney, Agent, or Firm* — Canon U.S.A., Inc. IP Division

(57) ABSTRACT

A network device includes a memory storing instructions, and a processor which is capable of executing the instructions causing the network device to receive an input of data including a setting value required for use of the network device in an environment in which the network device is arranged, activate a mode for participating in a mesh network identified by identification information specified previously, by using a wireless communication function, and distribute the input data to a network device other than the own network device via the mesh network.

16 Claims, 15 Drawing Sheets

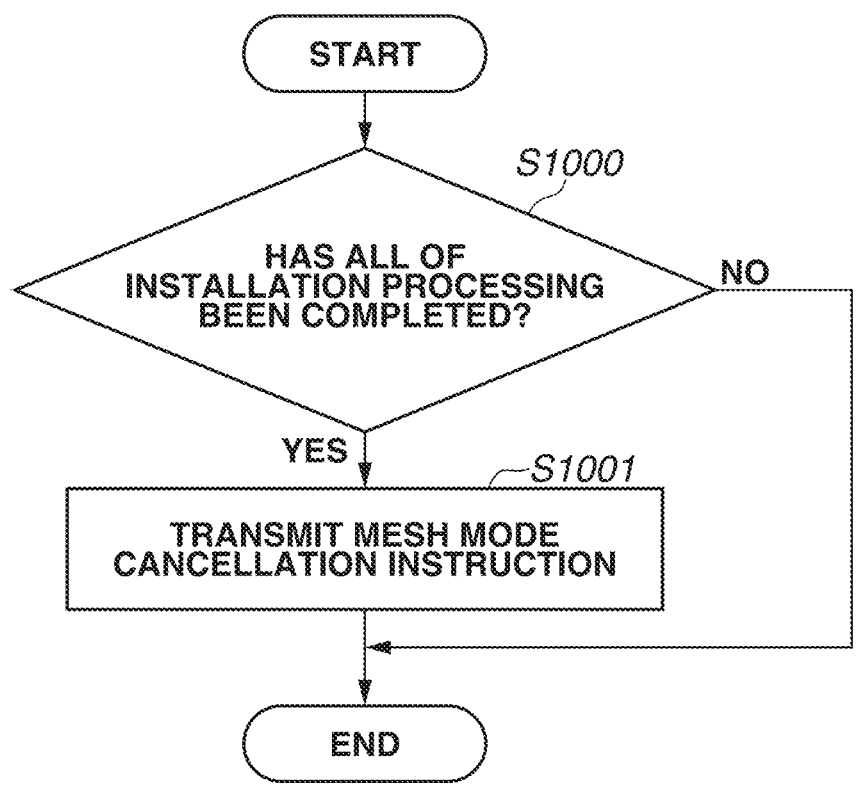

FIG.12

○ AUTOMATIC INSTALLATION SUPPORT FUNCTION

MESH GROUP APPARATUS LIST

| SERIAL NUMBER | MODEL | INSTALLATION STATE |
|---|---|---|
| D111 | MODEL A | COMPLETED |
| D123 | MODEL A | BEING INSTALLED |
| E500 | MODEL B | UNDISTRIBUTED |
| E510 | MODEL B | UNDISTRIBUTED |

FIG. 14

○ AUTOMATIC INSTALLATION SUPPORT FUNCTION

MESH GROUP APPARATUS LIST

| SERIAL NUMBER | MODEL | INSTALLATION SITE | INSTALLATION STATE |
|---|---|---|---|
| D111 | MODEL A | 3F COPYING ROOM | COMPLETED |
| D123 | MODEL A | 3F Room1 CENTER | BEING INSTALLED |
| E500 | MODEL B | 3F Room2 WINDOW SIDE | ERROR |
| E510 | MODEL B | 3F Room2 ENTRANCE SIDE | UNDISTRIBUTED |

NETWORK DEVICE AND METHOD THEREFOR

BACKGROUND OF THE INVENTION

Field of the Invention

The present invention relates to a management technique of a network device such as an information processing apparatus using a wireless communication technology.

Description of the Related Art

Conventionally, when a client purchases and newly introduces a network device such as an image processing apparatus, a network camera, or a digital medical device, an initial installation operation according to an environment, which is to be performed in an operating environment of the client, has been necessary to be performed. For example, because customization or activation of software such as firmware and settings with respect to setting values corresponding to a network setting of an image processing apparatus and attribution information unique to the client have not been performed, settings according to an operating environment is necessary to be performed.

Performing the above-described installation operation requires great time and effort. Thus, there is provided a method of automatically applying data necessary for the installation operation. In the method, data including software such as firmware and the setting values necessary for the installation operation (hereinafter, referred to as "installation data") is prepared in advance, and the prepared data is imported to the network device together with operating instruction information. The above-described operation is performed by an installation operator at a client site or an area used for the installation operation immediately before making a delivery to the client site.

Japanese Patent Application Laid-Open No. 2016-110339 discusses a technique in which an operator imports installation data to an image processing apparatus in a client environment via a local area network of that client environment or a universal serial bus (USB) memory.

With respect to the installation operation using the USB memory described in Japanese Patent Application Laid-Open No. 2016-110339, because an operation of importing the installation data is performed at each network device, great time and effort will be necessary for the initial network setting if a large number of network devices are to be installed. Further, in a case where a plurality of operators concurrently performs the installation operation, a plurality of USB memories storing the personal information of the client will be prepared, and thus there is a need for improvement in terms of cost or security.

Further, in a case where the installation operation using a local network of the client environment described in Japanese Patent Application Laid-Open No. 2016-110339 is to be performed, at least an initial setting of the network, e.g., allocation of an internet protocol (IP) address, has to be previously performed with respect to the network device to be installed. However, if a large number of network devices are to be installed, great time and effort will be required for the initial setting of the network. Furthermore, in a case where the installation operation is performed in the client environment, there is a case where a local network of the client environment cannot be used for the installation operation because of a requirement of the client. For example, connection with respect to the internet may be prohibited because of a security reason, or use of the intranet may be prohibited in order to prevent an increase in the communication load.

SUMMARY OF THE INVENTION

According to an aspect of the present invention, a network device includes a memory storing instructions, and a processor which is capable of executing the instructions causing the network device to receive an input of data including a setting value required for use of the network device in an environment in which the network device is arranged, activate a mode for participating in a mesh network identified by identification information specified previously, by using a wireless communication function, and distribute the input data to a network device other than the own network device via the mesh network.

Further features of the present invention will become apparent from the following description of exemplary embodiments with reference to the attached drawings.

BRIEF DESCRIPTION OF THE DRAWINGS

FIG. 10 is a flowchart illustrating mesh mode cancellation processing.

FIG. 12 is a diagram illustrating an example of an installation state checking screen according to a first exemplary embodiment.

FIG. 14 is a diagram illustrating an example of an installation state checking screen according to a third exemplary embodiment.

DESCRIPTION OF THE EMBODIMENTS

Hereinafter, exemplary embodiments of the present invention will be described with reference to the appended drawings.

Figure 1:
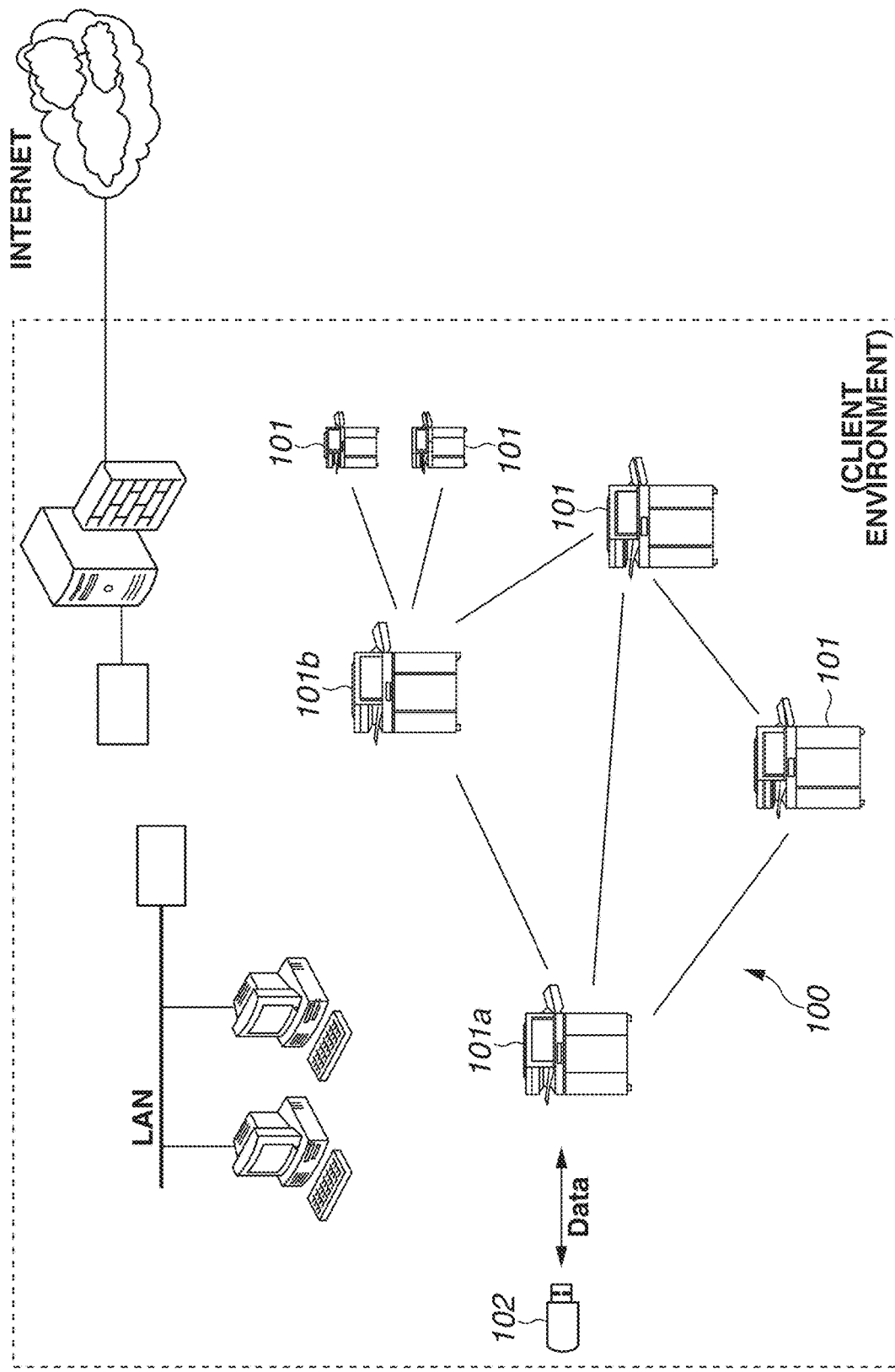
FIG. 1 is a diagram illustrating an example of a system configuration assumed in the present invention.

A first exemplary embodiment will be described below. FIG. 1 is a diagram illustrating an example of a system configuration assumed in the present invention in which an installation operation is performed with respect to a network device in a client environment.

In FIG. 1, an image processing apparatus 101 such as a printer or a copying machine is illustrated as an example of the network device. In addition, the present exemplary embodiment is applicable to a device which includes hardware for realizing the below-described wireless network function and the import function of setting data including at least a network setting. More specifically, the device may be a network peripheral device such as a router, a network camera used as a monitoring camera, a digital medical device, a digital home electric appliance, or a three-dimensional (3D) printer.

A network 100 illustrated in FIG. 1 is a wireless network established according to the below-described procedure specific to the present exemplary embodiment. More specifically, the network 100 is a wireless network that connects optional image processing apparatuses 101 to each other, and a network such as a mesh network complying with a wireless communication standard (i.e., a standard of the Institute of Electrical and Electronics Engineers (IEEE) 802.15.4) can be given as an example. The network 100 has a network system different from that of a backbone network such as a wired or wireless local area network (LAN) previously provided in the client environment. Data communication between the image processing apparatuses 101 can be executed via the network 100.

The image processing apparatus 101 includes an interface for connecting a transportable storage device 102. In the present exemplary embodiment, a universal serial bus (USB) interface is used although an interface of any type can be used for connecting the transportable storage device 102. By connecting the transportable storage device 102 to the interface, data can be read from or written into the transportable storage device 102.

In the present exemplary embodiment, a USB storage 204 which implements a USB mass storage class is used for the transportable storage device 102 although a storage device of any type can be used as long as the storage device can be easily detached from the network device serving as a host. Further, in the present exemplary embodiment, the transportable storage device 102 includes installation data such as setting values of a network setting or various operation parameters and software such as firmware. Furthermore, a module such as a subscriber identity module (SIM) for mobile communication communicable with an external device may be mounted on the transportable storage device 102, so that the installation data may be acquired by communicating with the external device as necessary. The communication can be realized by establishing a secure virtual private network (VPN) with a providing source of the installation data.

In FIG. 1, although it is assumed that the installation operation is performed in the client environment, the installation operation via the network 100 can be realized in an environment other than the client environment.

Figure 2:
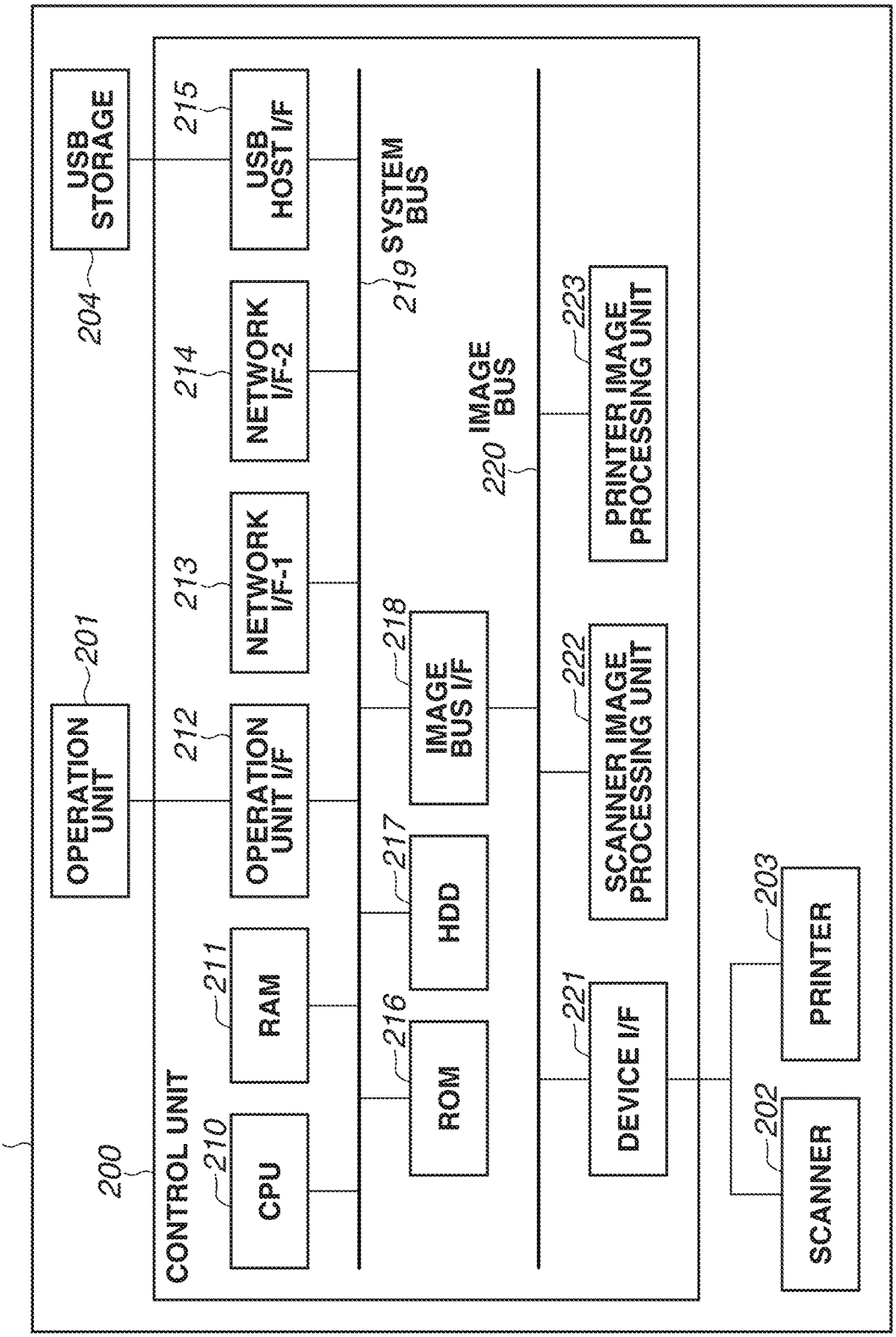
FIG. 2 is a block diagram illustrating an example of a hardware configuration of an image processing apparatus.

FIG. 2 is a block diagram illustrating an example of a configuration of an image processing apparatus 101 according to the present exemplary embodiment.

The image processing apparatus 101 includes a control unit 200, an operation unit 201, a scanner 202, a printer 203, and a USB storage 204. The USB storage 204 is an external storage device for storing data and is synonymous with the transportable storage device 102 illustrated in FIG. 1. Further, the USB storage 204 is attachable to and detachable from a USB host interface (I/F) 215.

As processing units relating to the operation unit 201, the control unit 200 includes a central processing unit (CPU) 210, a random access memory (RAM) 211, an operation unit I/F 212, a network I/F-1 213, a network I/F-2 214, and a USB host I/F 215. The control unit 200 further includes a read only memory (ROM) 216, a hard disk drive (HDD) 217, an image bus I/F 218, and a system bus 219. A specific program for realizing the below-described characteristic processing of the present exemplary embodiment executable by the CPU 210 is stored in the HDD 217 or the ROM 216.

Further, the control unit 200 includes an image bus 220, a device I/F 221, a scanner image processing unit 222, a printer image processing unit 223 as processing units relating to printing and scanning operations. The scanner 202 and the scanner image processing unit 222 may be provided as necessary. Further, the USB storage 204 is also attached thereto and detached therefrom as necessary.

The CPU 210 is a controller that controls the entirety of the control unit 200. The RAM 211 is a memory for temporarily storing image data or processing necessary for operating software.

The operation unit I/F 212 serves as an interface with respect to the operation unit 201, and outputs image data to be displayed on the operation unit 201 to the operation unit 201. Further, the operation unit I/F 212 transmits information input by the user via the operation unit 201 to the CPU 210.

For example, the network I/F-1 213 is used for connecting to a backbone network such as a local area network (LAN), and serves as a network via which a print job or communication data of various kinds is transmitted at the client site. The network I/F-1 213 is used for network communication that is to be usable when the installation operation using installation data of the present exemplary embodiment is completed. In addition, any wired or wireless network can be connected to the network I/F-1 213.

The network I/F-2 214 is connected to the network 100 used for a mesh network, and exchanges information with an external device via wireless communication via the network 100. For example, wireless communication compliant with a wireless communication standard known as the Bluetooth (registered mark) may correspond thereto. Further, for example, the external device may be an image processing apparatus 101 other than own image processing apparatus 101.

The USB host I/F 215 reads data stored in the USB storage 204 and transmits the data stored in the USB storage 204 to the CPU 210. Further, the USB host I/F 215 outputs data to the USB storage 204 or another external storage device connected to the image processing apparatus 101. In addition, a plurality of USB devices including the USB storage 204 can be connected to the USB host I/F 215. The ROM 216 serves as a boot ROM, and a boot program of the system is stored therein. The HDD 217 is an external storage device which stores system software, image data, and setting information.

The image bus I/F 218 is a bus bridge that connects the system bus 219 and the image bus 220 to execute data conversion. The system bus 219 serves as a common data exchange path of respective components constituting the control unit 200. The image bus 220 is a path configured of a peripheral component interconnect (PCI) bus or a bus compliant with the IEEE 1394 standard which transmits image data at high speed.

The device I/F 221 connects the scanner 202 or the printer 203 as an image input/output device to the control unit 200, and executes synchronous/asynchronous conversion of image data. The scanner image processing unit 222 executes correction, processing, and editing of an input image. The printer image processing unit 223 executes correction of print output image data or conversion of resolution thereof according to a performance of the printer 203.

In addition, the hardware configuration illustrated in FIG. 2 is merely an example, and constituent elements thereof may be increased or decreased as necessary. For example, in FIG. 2, although the configuration includes two network interfaces, the network interfaces may be more than two in order to separate wired communication and wireless communication. Further, the USB host I/F may be provided more than one.

Further, with respect to the network device other than the image processing apparatus 101, for example, hardware (e.g., a camera or a specific sensor) unique to the function of that network device is realized in substitution for the constituent element connected to the image bus 220.

Figure 3A:
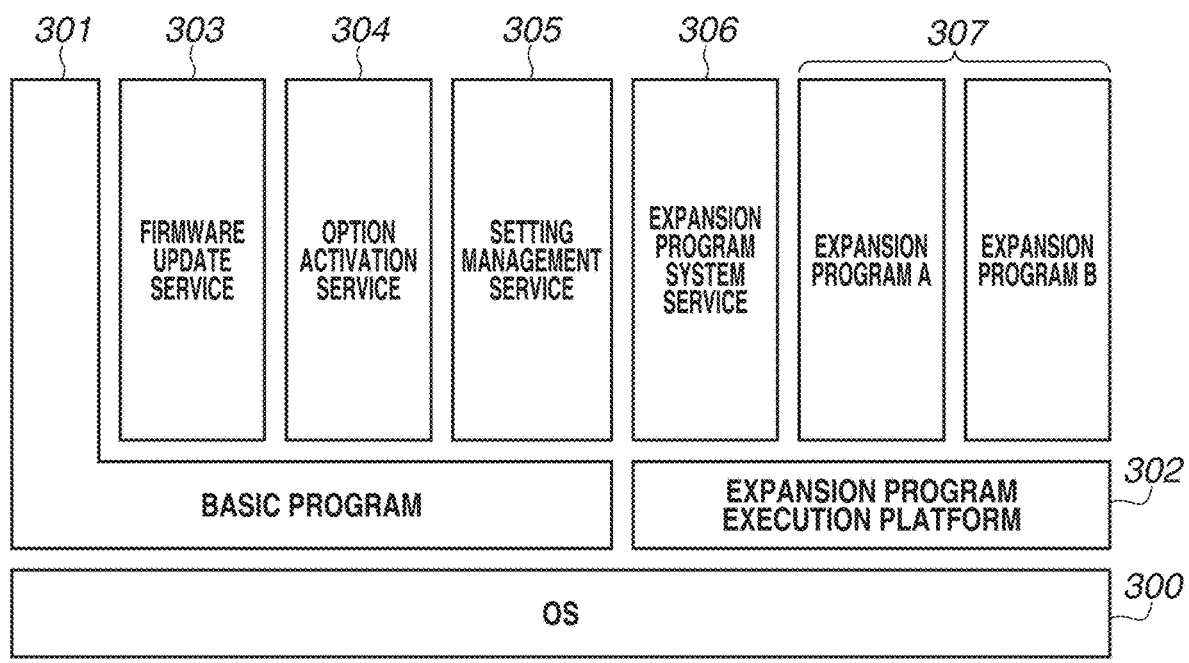
FIGS. 3A and 3B are block diagrams illustrating examples of a software configuration of the image processing apparatus.

FIG. 3A is a diagram illustrating an example of a module (service) configuration realized by the software executed by the CPU 210 of the image processing apparatus 101.

FIG. 3A will be described. A basic program 301 and an expansion program execution platform 302 operate on an operating system (OS) 300. The basic program 301 is a control program of functions such as printing, facsimile, and scanning functions which are originally included in the image processing apparatus 101. The expansion program execution platform 302 is an execution platform of an expansion program for adding a function to the image processing apparatus 101.

A firmware update service 303, an option activation service 304, and a setting management service 305 operate on the basic program 301. Further, an expansion program system service 306 and an expansion program 307 operate on the expansion program execution platform 302.

The firmware update service 303 is a service which provides various functions for updating the firmware. For example, the firmware update service 303 refers to the specified firmware and determines whether update of that firmware is necessary. Further, the firmware update service 303 updates the firmware of the image processing apparatus 101 with respect to the basic program 301, or via the basic program 301. The option activation service 304 is a program for activating an option function previously embedded in the basic program 301 (hereinafter, also referred to as "embedded option program"). The option activation service 304 identifies and activates an option function specified by an instructed option license file. The setting management service 305 is a program for managing setting information including various setting values such as a network setting and operation parameters of a printer or a facsimile machine. For example, if a file including one or a plurality of settings or a plurality of pieces of setting information is specified, the setting management service 305 provides a function of rewriting the setting information of the basic program 301.

The expansion program system service 306 is a utility library provided by the system commonly useful to the expansion programs 307. By calling the function of the expansion program system service 306 from the expansion program 307, time and effort of developing the expansion program can be saved. The expansion program 307 can access respective modules of the image processing apparatus 101 such as another expansion program 307 only via the expansion program execution platform 302 or the respective services 303 to 306. Further, the expansion program 307 having a user interface (UI) can display an icon on a main menu screen (not illustrated) displayed on the operation unit 201 of the image processing apparatus 101.

In addition, the software configuration in FIG. 3A illustrates only a basic portion, and the image processing apparatus 101 may have another service according to an implementation environment. Further, the image processing apparatus 101 does not have to include a service that is not necessary because of limitations placed on the setting.

Figure 3B:
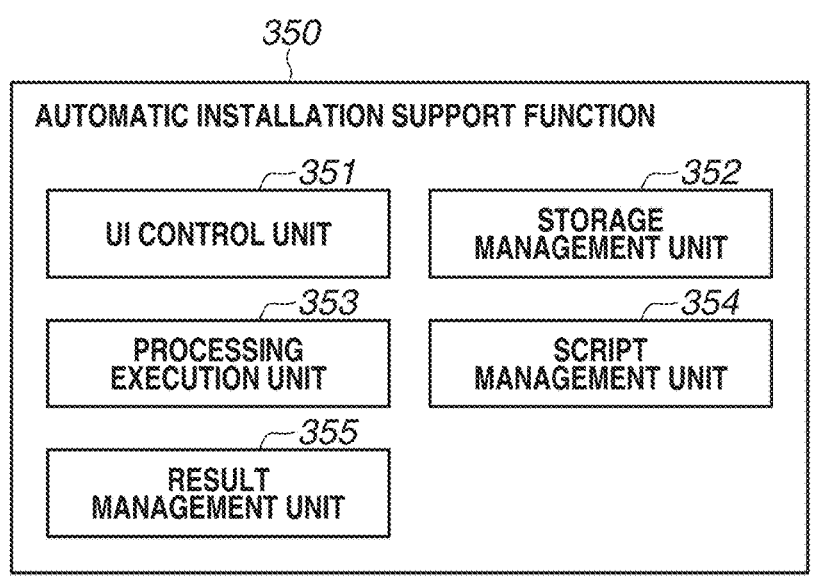

FIG. 3B is a diagram illustrating an example of a functional configuration of an automatic installation support function 350 (hereinafter, referred to as "support function") operating in the image processing apparatus 101. The support function 350 is a function realized by the CPU 210 executing a program specific to the present exemplary embodiment. This specific program is a program provided as the basic program 301 or the expansion program 307 in FIG. 3A.

The support function 350 automatically (or semi-automatically) applies required data included in the installation data acquired from the USB storage 204 to the image processing apparatus 101. The support function 350 includes a UI control unit 351, a storage management unit 352, a processing execution unit 353, a script management unit 354, and a result management unit 355.

The UI control unit 351 provides a UI for operating the support function 350 to the user via the operation unit 201 and receives a user operation. The storage management unit 352 reads and writes data stored in the USB storage 204. Further, the storage management unit 352 detects a change in an attached or a detached state of the USB storage 204.

The processing execution unit 353 cooperates with the UI control unit 351, the storage management unit 352, and the script management unit 354 to execute installation processing. Further, the processing execution unit 353 appropriately uses the above-described firmware update service 303, the option activation service 304, the setting management service 305, and the expansion program system service 306 to realize reflection of settings or activation of software according to the installation data.

The script management unit 354 analyzes operation instruction information (script) which the storage management unit 352 acquires from the USB storage 204 or which the processing execution unit 353 acquires via the network I/F-2 214. Further, the script management unit 354 determines processing to be executed by the processing execution unit 353 and the processing order, and instructs the processing execution unit 353 about processing to be executed.

The result management unit 355 manages a result of the installation processing executed by the processing execution unit 353. The result management unit 355 manages an installation state of the image processing apparatus 101, i.e., whether the installation processing of the image processing apparatus 101 is completed or in execution, or whether the installation data has not been distributed. Further, according to an instruction from the processing execution unit 353, the result management unit 355 externally transmits a result of the installation processing or responds to an inquiry about the installation state from an external device via the network I/F-2 214. Further, when the result management unit 355 receives a notice of the result from the external apparatus, the result management unit 355 reads the received notice, reflects the received result on the data managed thereby, and executes transfer processing of the received result with respect to another external apparatus. In addition, the result management unit 355 is operable even if the processing execution unit 353 is executing the installation processing, and communication between a plurality of external apparatuses can be relayed thereby.

Figure 4:
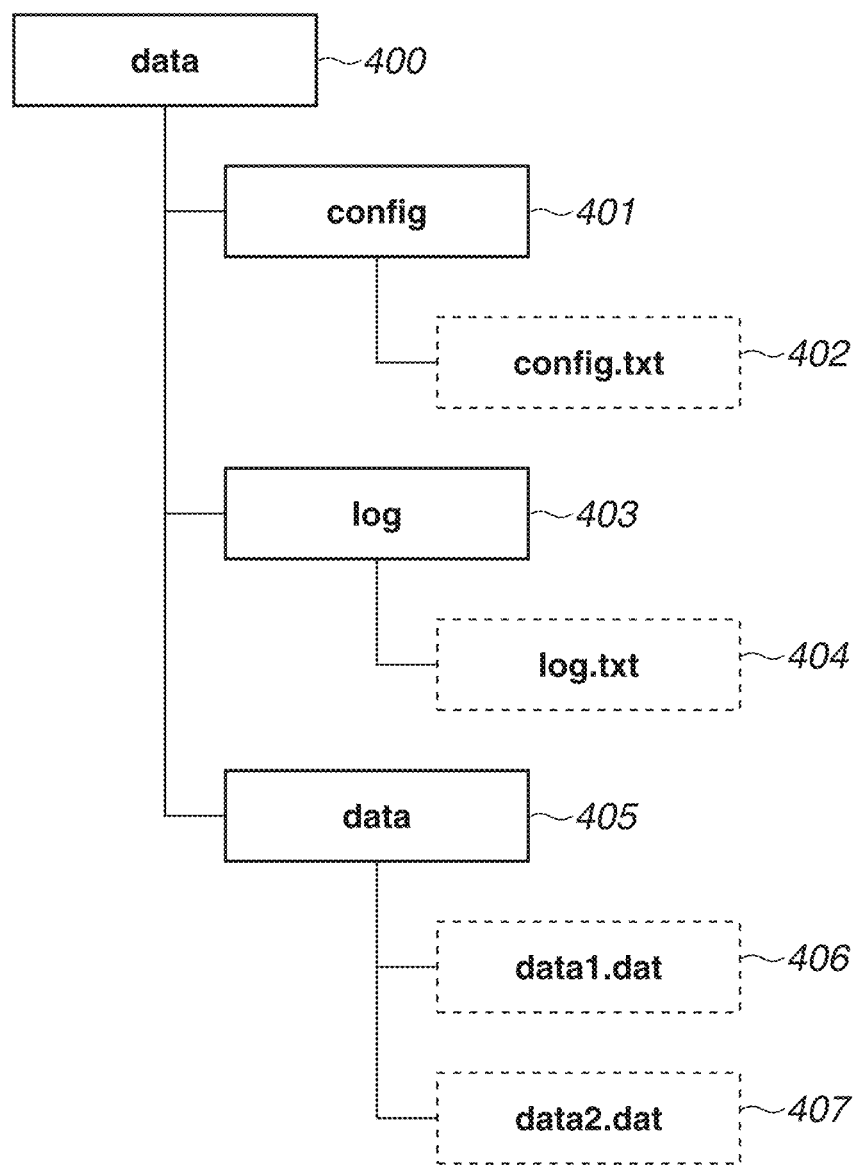
FIG. 4 is a diagram illustrating a data region of an expansion program.

FIG. 4 is a diagram illustrating an example of a data region of the expansion program 307. The data region of the expansion program 307 is allocated to the HDD 217, and uniquely managed by the expansion program 307. A data folder 400 is a folder for storing various kinds of setting information of the expansion program 307. The data folder 400 is created by the expansion program execution platform 302 when the expansion program 307 is installed. A config folder 401, a log folder 403, and a data folder 405 exist in the data folder 400.

A config.txt file 402 is stored in the config folder 401. The config. text file 402 is a file that perpetuates the information necessary for the expansion program 307 to operate (e.g., a setting value such as flag information for determining a function or an operation of the expansion program 307). A log.txt file 404 is stored in the log folder 403. The log.txt file 404 is a file that perpetuates a record of processing executed by the expansion program 307. A data1.dat file 406 and a data2.dat file 407 are stored in the data folder 405. The data1.dat file 406 and the data2.dat file 407 are information processed by the expansion program 307 which indicate at least a part of the copied installation data or data as a processing target. Further, the data1.dat file 406 and the data2.dat file 407 also include the progress management files of the automatic installation.

Figure 5:
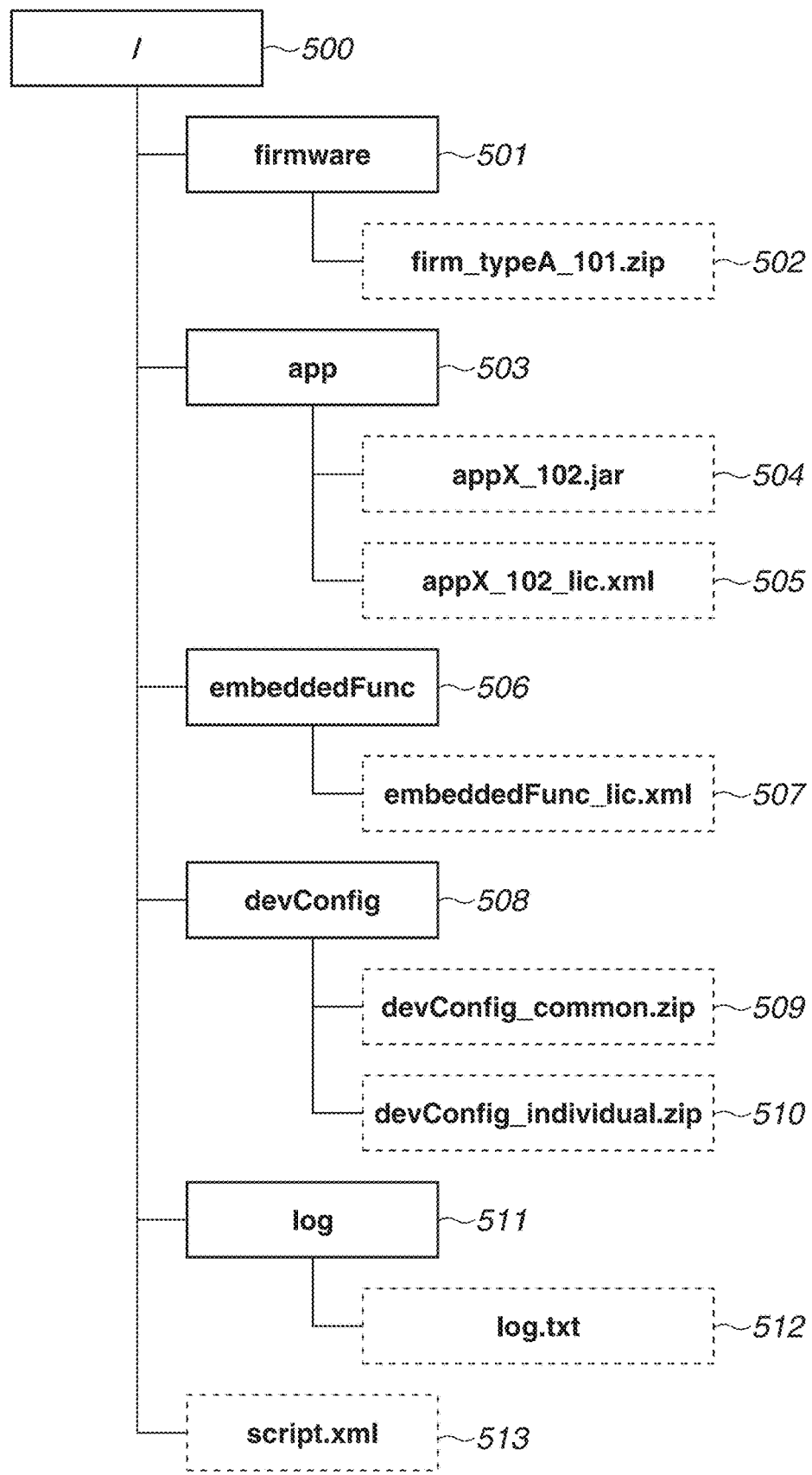
FIG. 5 is a diagram illustrating an example of a data structure including installation data of a universal serial bus (USB) storage.

FIG. 5 is a diagram illustrating an example of a structure of data including installation data stored in the USB storage 204 used by the support function 350.

A firmware folder 501, an app folder 503, an embeddedFunc folder 506, and a devConfig folder 508 exist in a root folder 500. Further, a log folder 511 and a script.xml file 513 also exist in the root folder 500. The firmware folder 501 is a folder for storing firmware to be updated with respect to the network device. In FIG. 5, a firm_typeA_101.zip file 502 in which a firmware group is archived in a zip format exists in the firmware folder 501. In addition, although the firmware group is expressed by a file in a zip format in FIG. 5, the exemplary embodiment is not limited thereto, and necessary files may be arranged under the firmware folder 501. Further, a plurality of firmware files in a zip format may be arranged.

An app folder 503 is a folder for storing an expansion program to be installed in the network device in the installation processing and a license file necessary for installing the expansion program. In FIG. 5, an expansion program appX_102.jar 504 and a license file appX_102.lic.xml 505 exist in the app folder 503. Herein, although the license file is expressed by extensible markup language (XML), the license file may be expressed by a text format. An embeddedFunc folder 506 is a folder for storing a license file for activating an embedded option program of the network device. In FIG. 5, a license file embeddedFunc_lic.xml 507 exists in the embeddedFunc folder 506.

A devConfig folder 508 is a folder for storing setting value data in which a plurality of setting values to be set to the network device is organized. In FIG. 5, a setting value file "devConfig_common.zip 509" archived in a zip format (hereinafter, referred to as "common setting value file 509") exists in the devConfig folder 508. A devConfig_individual.zip 510 (hereinafter, referred to as "individual setting value file 510") also exists in the devConfig folder 508. A setting value applied to the individual network device, e.g., an individual network setting of a device name, an installation site, or an internet protocol (IP) address, is stored in the individual setting value file 510. A setting value of a setting (e.g., a sleep time setting) uniform at each condition of a client environment or an installation environment of an imported model commonly applied a plurality of image processing apparatuses 101 is stored in the common setting value file 509. For example, one or a plurality of files in the XML format, in which a setting item and a setting value with respect to the setting item are defined, is included in the common setting value file 509 and the individual setting value file 510.

A log folder 511 is a folder for storing a file of an execution result (hereinafter, referred to as "log") of the support function 350. In FIG. 5, although a log.txt 512 is stored in the log folder 511, the log folder 511 and the log.txt 512 do not exist before the support function 350 is executed. The support function 350 firstly creates the log folder 403 and the log.txt 404 during or after execution of the support function 350, and creates the log folder 511 and the log.txt 512 by copying the log folder 403 and the log.txt 404.

A script.xml 513 (hereinafter, referred to as "script 513") is an instruction that indicates installation content or a processing order for automatically executing the installation processing. The script 513 will be described below in detail with reference to FIG. 6. In FIG. 5, although only one script 513 is described, the exemplary embodiment is not limited to the above, and the script 513 may be divided into a script used commonly and a script used individually. Although the script 513 is a file which defines an order of the installation processing and use data, as to whether the support function 350 is executable may be determined based on existence or non-existence of the script file 513. In other words, the script 513 may be used as an identifier which indicates that the USB storage 204 that is in use is the USB storage used for the support function 350 of the present exemplary embodiment.

In addition, the structure in FIG. 5 is merely an example, and the structure may include optional folders and files. For example, installation data for common use may be managed by one folder, whereas installation data to be applied individually may be managed by another folder. Further, with respect to a file describing the installation data, more than one files may be provided as necessary, or the file does not have to be provided.

Figure 6:
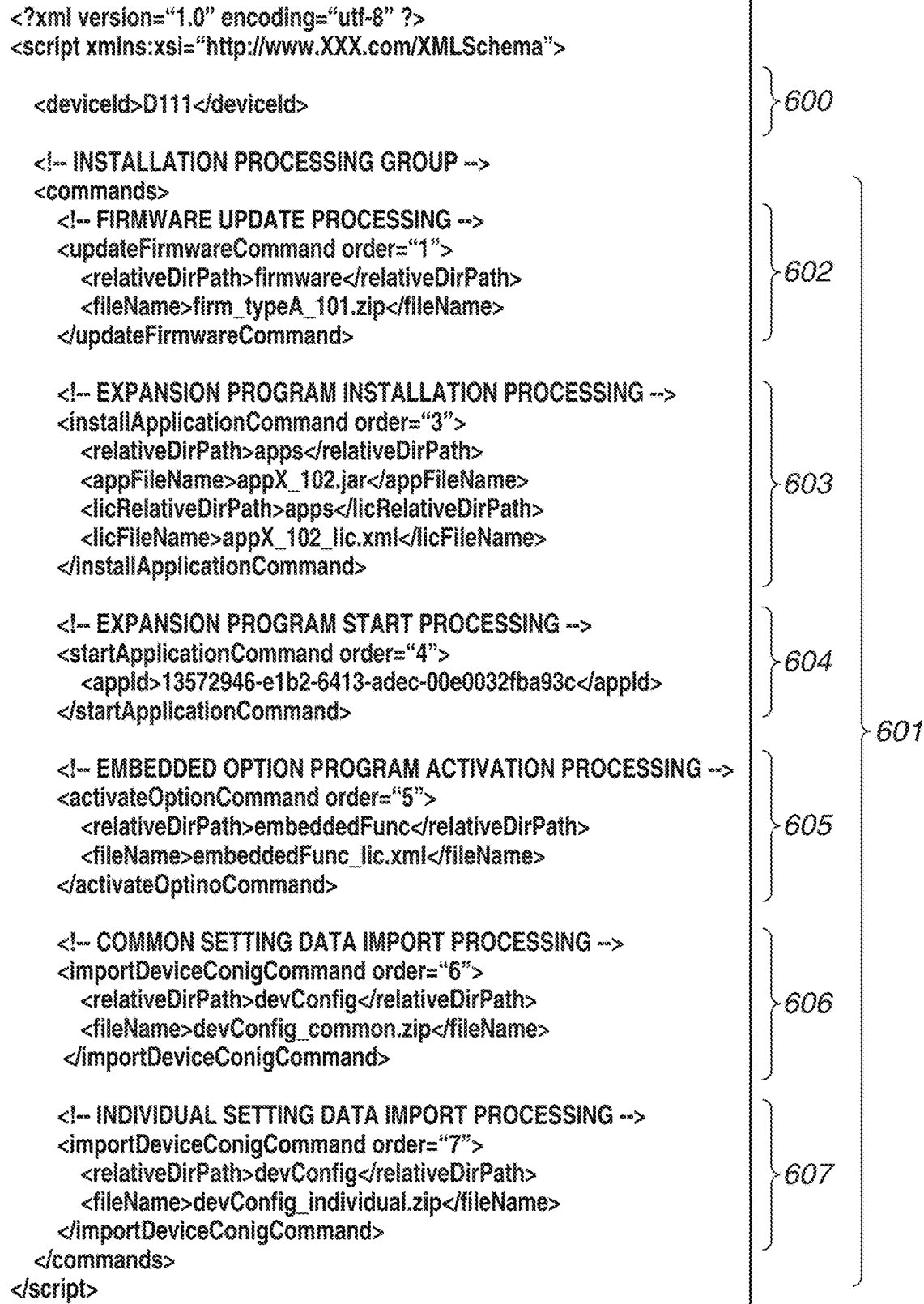
FIG. 6 is a diagram illustrating an example of a script used for installation.

FIG. 6 is a diagram illustrating an example of the script 513 used for the installation processing which describes an installation procedure for the support function 350 to automatically reflect the setting value included in the installation data on the network device (i.e., image processing apparatus 101).

The script 513 is acquired by the storage management unit 352 or the processing execution unit 353 of the support function 350, and analyzed by the script management unit 354. According to the description of the script 513 analyzed by the script management unit 354, the processing execution unit 353 executes processing such as installation of software or application of the setting value. The script 513 used for the installation processing described in the present exemplary embodiment is described in the XML, and consists of a device identification portion 600 and a processing description portion 601. In addition, although the script 513 is expressed by the XML, the script 513 may be written by a shell script instead of the XML.

The device identification portion 600 describes a target identifier D111 for identifying a network device as an installation target, and consists of a tag "<deviceId>". A serial number of the network device is used for the identification information because the image processing apparatuses 101 as installation targets have to be identified individually.

A processing group necessary for the installation operation is described in the processing description portion 601. The processing description portion 601 includes a firmware update processing portion 602, an expansion program installation processing portion 603, and an expansion program start processing portion 604. The processing description portion 601 further consists of an embedded option activation processing portion 605, a common setting data import processing portion 606, and an individual setting data import processing portion 607. The tag that describes the processing includes an Order attribute, and in the present exemplary embodiment, a processing order is determined according to a value of the Order attribute.

The firmware update processing portion 602 describes processing of updating the firmware via the firmware update service 303. The firmware update processing portion 602 defines the processing by describing a tag <updateFirmwareCommand>. More specifically, a file stored in the USB storage 204 is specified by the tags <relativeDirPath> and <fileName>. A relative path from the root folder 500 of the USB storage 204 to the firmware to be used is described in the tag <relativeDirPath>. A firmware file to be used is specified by the tag <fileName>. In FIG. 6, firmware archived in a zip format is specified.

The expansion program installation processing portion 603 describes processing of installing a specified expansion program, and the processing is defined by a tag <installApplicationCommand>. The expansion program installation processing portion 603 consists of tags <relativeDirPath> and <appFileName>. A relative path from the root folder 500 of the USB storage 204 to the entity of the expansion program as an installation target is described by the tag <relativeDirPath>. An entity of the expansion program as an installation target is specified by the tag <appFileName>. In FIG. 6, an expansion program in a Jar file format is specified. In addition, a format of the expansion program is not limited to the Jar file format. Further, a license with respect to the expansion program as an installation target is specified by the tags <licRelativeDirPath> and <licFileName>. A relative path from the root folder 500 of the USB storage 204 to the license file of the expansion program is described by the tag <licRelativeDirPath>. An entity of the license of the expansion program is specified by the tag <licFileName>. In FIG. 6, the license file in the XML format is specified. However, a file format of the license file is not limited thereto, and the license file may be in a text format.

In the expansion program start processing portion 604, processing is defined by a description of the tag <startApplicationCommand>, and the expansion program as a start target is specified by the tag <appId>. An identification (ID) that uniquely identifies the expansion program as a start target is specified by the tag <appId>.

In the option activation processing portion 605, processing of activating an embedded option program is defined by a description of the tag <activateOptionCommand>. The option activation processing portion 605 specifies the embedded option program to be activated by the tags <relativeDirPath> and <fileName>. A relative path from the root folder 500 of the USB storage 204 to the license file for the embedded option program is described on the tag <relativeDirPath>. An entity of a license for activating the embedded option program is specified in the tag <fileName>. In FIG. 6, although a license file in the XML format is specified, a file format of the license file is not limited thereto. In addition, description of the installation processing is not necessary for the embedded option program that is not pre-installed or activated in the image processing apparatus 101.

Each of the common setting data import processing portion 606 and the individual setting data import processing portion 607 (hereinafter, referred to as processing portions 606 and 607) defines processing by a description of the tag <importDeviceConfigCommand>. The processing portions 606 and 607 specify the setting data to be imported by the tags <relativeDirPath> and <fileName>. A relative path from the root folder 500 of the USB storage 204 to the entity of the setting data as an import target is described by the tag <relativeDirPath>. An entity of the setting data as an import target is specified by the tag <fileName>.

In addition, description of the script 513 used for the installation processing illustrated in the present exemplary embodiment is not intended to limit the processing necessary for the installation of the image processing apparatus 101. The processing may be overlapped, increased, or decreased, or another processing may be executed as necessary. For example, if the firmware is updated in two steps, firmware update processing may be executed twice. Further, a definition of reactivation processing may be added thereto if reactivation is necessary. Further, in the script 513 in FIG. 6, although a script to be executed and a target image processing apparatus 101 are uniquely specified by the device identification portion 600, the configuration is not limited thereto, and a target image processing apparatus 101 may be specified by a type of image processing apparatus. Further, information such as the installation site which makes it possible to specify the script may be described, so that the operator is allowed to select whether to execute the script before starting the installation processing on the image processing apparatus 101.

<Example of Operation Flow According to the Present Exemplary Embodiment>

Herein, an operation flow according to a method of newly performing initial installation of a network device in the present exemplary embodiment will be described. First, as a prerequisite for performing the initial installation operation of the image processing apparatus 101, the operator stores the installation data to be applied to the image processing apparatus 101 as an installation target in the USB storage 204. The USB storage 204 that supports mobile communication stores data acquired from a providing source of the installation data via the communication network thereof.

Subsequently, the operator performs the following installation operations in an installation environment (in the example in FIG. 1, an environment of the client site).

As operation 1, the operator arranges the image processing apparatus 101 at a position requested from the client. In the operation, in addition to simply arranging the image processing apparatus 101, the operator also connects optional hardware such as a finisher, a sheet feeding device, or an authentication device as necessary.

As operation 2, when arrangement of the image processing apparatus 101 has been completed, power is supplied to the image processing apparatus 101, and the operator activates an operation mode for performing an installation operation. Herein, the operation mode for performing the installation operation includes a mode (mesh mode) for establishing or participating in a mesh network complying with the above-described wireless communication standard (IEEE 80215.4). Further, application of the installation data is executed or operated in that mode. This activation processing is executed with respect to all of the image processing apparatuses 101 as the installation targets. Herein, the operator may activate the mesh mode by inputting an activation instruction via the operation unit 201 of the image processing apparatus 101 or a mobile terminal owned by the operator via near field radio communication (NFC). An example of the input screen of the mobile terminal using the NFC will be described below with reference to FIG. 11A.

As operation 3, when arrangement of one or more image processing apparatuses 101 is completed, the operator connects the USB storage 204 storing the installation data to any one of the arranged image processing apparatuses 101. The support function 350 of the image processing apparatus 101 starts executing the installation processing by using the installation data illustrated in FIGS. 5 and 6 stored in the USB storage 204 connected thereto. In a case where the support function 350 is realized as the expansion program 307, a program of the support function 350 is installed in the image processing apparatus 101 to which the USB storage 204 is connected. The installation processing executed by the support function 350 will be described below in detail with reference to FIG. 7.

As operation 4, the operator who has connected the USB storage 204 to the specific image processing apparatus 101 continuously performs the arrangement operation described in the above-described operation 2 if there is a remaining image processing apparatus 101 as an installation target. The connection operation of the USB storage 204 described in the operation 3 does not have to be performed on the remaining image processing apparatus 101 as an installation target.

As operation 5, the operator completes arrangement of all of the image processing apparatuses 101 as an installation target, selects any one of the image processing apparatuses 101, and waits for the completion of the installation processing of all of the image processing apparatuses 101 in a vicinity of the selected image processing apparatus 101. In the present exemplary embodiment, it is assumed that the operator returns to and waits in a vicinity of the image processing apparatus 101 to which the USB storage 204 is connected. In the waiting period, a screen (described below in FIG. 12) for checking the installation states of the image processing apparatuses 101 as the installation targets is provided on a display panel of the selected image processing apparatus 101.

As operation 6, when the operator can confirm that the installation processing of all of the image processing apparatuses 101 has been completed, the operator detaches the USB storage 204 from the image processing apparatus 101 and completes the entire installation operation.

The installation operation performed by the operator at a client site as a delivery place has been described as the above. Through the above-described installation operation, all of the image processing apparatuses 101 as the installation targets can connect to the backbone network such as the LAN via the network I/F-1 213 because the individual setting value file described below is reflected thereon.

Hereinafter, processing according to the above-described operations 2, 3, and 5 executed by the installation target network device will be described in detail.

As the characteristic control of the present exemplary embodiment, the installation target network devices respectively start a mesh mode and establish a group (hereinafter, referred to as "mesh group") for sharing the installation data with these installation target network devices.

Further, the network device (image processing apparatus 101), to which the USB storage 204 is connected in the above-described operation 3, is specified as a leader device for distributing the installation data (hereinafter, simply referred to as "leader"). In the example in FIG. 1, the image processing apparatus 101a is a leader. Further, a network device to which the USB storage 204 is not connected, which waits for a receipt of the installation data via any one of the network devices in the mesh group, is specified as a member device (hereinafter, simply referred to as "member"). Further, for the purpose of executing load distribution or parallel operation, a network device from among the members which controls distribution of the installation data to the other network devices is specified as a sub-leader device 101b (hereinafter, simply referred to as "sub-leader"). In the example in FIG. 1, the image processing apparatus 101b is a sub-leader.

Further, in a case where a plurality of USB storages 204 is connected to a plurality of network devices, a network device that has become a leader first operates as a leader, and a network device to which the USB storage 204 is connected later operates as a sub-leader (i.e., when a leader has already been detected from the mesh group). In addition, a network device operating as a member which completes the installation processing using the installation data received via the mesh network may operate as a sub-leader. A number of sub-leaders in the mesh group can be previously set at each mesh group described below. In other words, in the present exemplary embodiment, by setting the number of sub-leaders to "0", the installation data can be distributed by only a leader. More specifically, in the below-described exemplary embodiment, if a network device to which the installation data has not been applied (i.e., which the installation processing has not been completed) exists in the mesh group, an optional member operates as a sub-leader to distribute the installation data.

Herein, a mesh mode start instruction provided by an operator via a mobile terminal in the above-described operation 2 will be described with reference to FIGS. 11A and 11B. The NFC may be used for providing the start instruction from the mobile terminal.

Figure 11A:
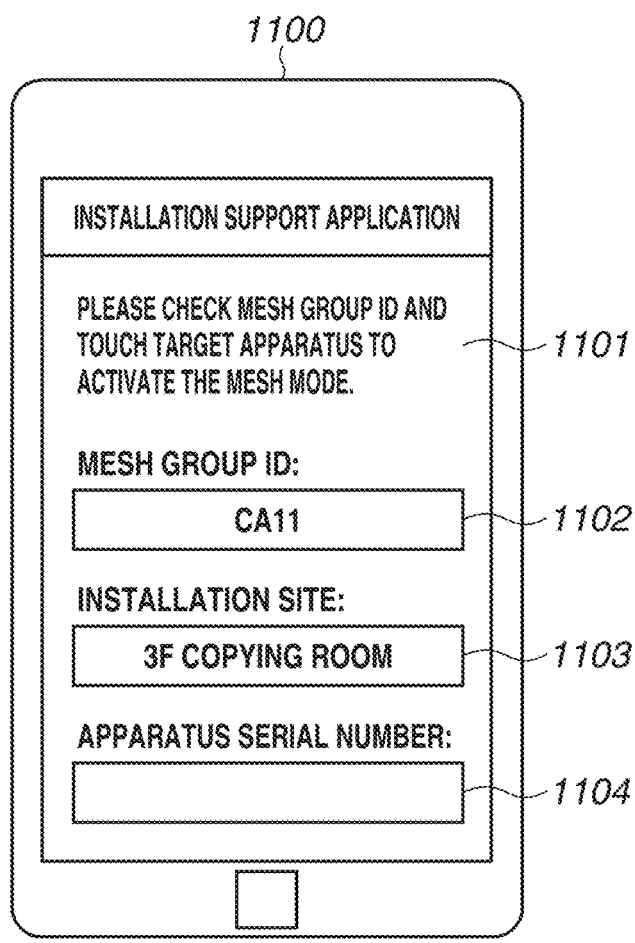
FIGS. 11A and 11B are diagrams illustrating examples of screens for inputting a mesh mode start instruction from a mobile terminal.
Figure 11B:
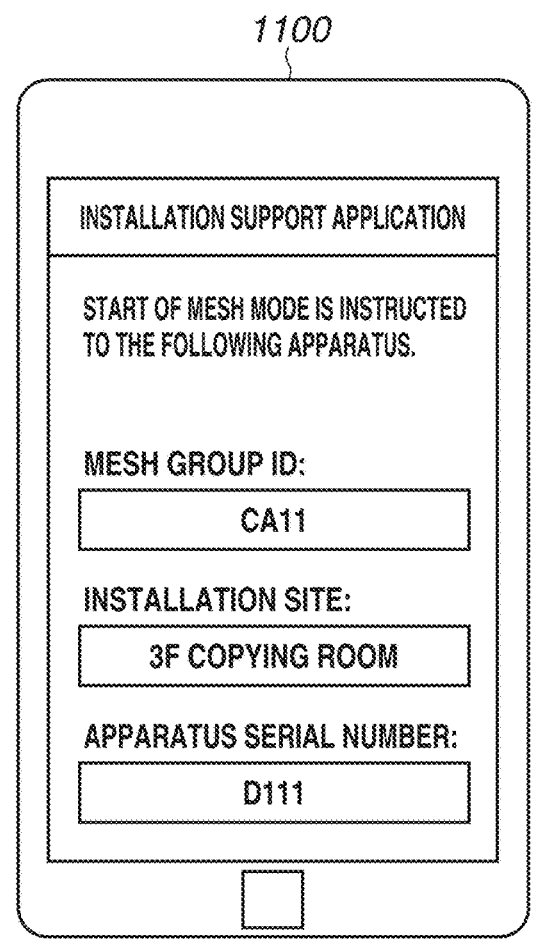

FIGS. 11A and 11B are examples of screens provided by an application executed on a mobile terminal 1100 via which the mesh mode start instruction is provided to the image processing apparatus 101. This application may be a web application owned by a service providing source that manages the installation data. FIG. 11A illustrates an instruction creation screen displayed before a mesh mode start instruction is provided, and FIG. 11B illustrates a result notification screen displayed after the mesh mode start instruction is provided.

Each of the screens in FIGS. 11A and 11B consists of a message display portion 1101, a mesh group ID display portion 1102, an installation site input portion 1103, and a device serial number display portion 1104.

A message for notifying the operator of information about a start of the mesh mode is displayed on the message display portion 1101. In the example illustrated in FIG. 11A, a message instructing the operator to check a value displayed on the mesh group ID display portion 1102 and to touch or bring the mobile terminal 1100 closer to the target image processing apparatus 101 is displayed thereon.

A mesh group ID used for establishing the mesh network between the image processing apparatuses 101 is displayed on the mesh group ID display portion 1102. The mesh group ID is a type of attribute information for identifying the network, and "PAN ID" defined by the IEEE 802.15.4 standard may be used for the mesh group ID. In the present exemplary embodiment, the mesh group ID is used as the identifier that enables a plurality of network devices as the installation processing targets to belong to the same network group to make a group through a single operation flow. One group can be established in the mesh network if the mesh group IDs are the same, and the installation data can be shared in that group.

In addition, a fixed value may be initially input as a value displayed on the mesh group ID display portion 1102, or a value may be automatically generated by the application of the mobile terminal 1100 as necessary. Further, a value may be input by the user. Furthermore, a value displayed on the mesh group ID display portion 1102 may be perpetuated in the mobile terminal 1100 in order to execute the installation processing on the same group in the mesh network.

The operator can input a value for identifying an installation site to the installation site input portion 1103. This input is not essential. A value input to the installation site input portion 1103 is applied to the image processing apparatus 101 according to a start of the mesh mode.

As illustrated in FIG. 11B, a serial number of the image processing apparatus 101 that has started the mesh mode is displayed on the serial number display portion 1104. For example, a value acquired from the image processing apparatus 101 when the operator provides the mesh mode start instruction by bringing the mobile terminal 1100 closer to the image processing apparatus 101 is displayed on the serial number display portion 1104.

Figure 7:
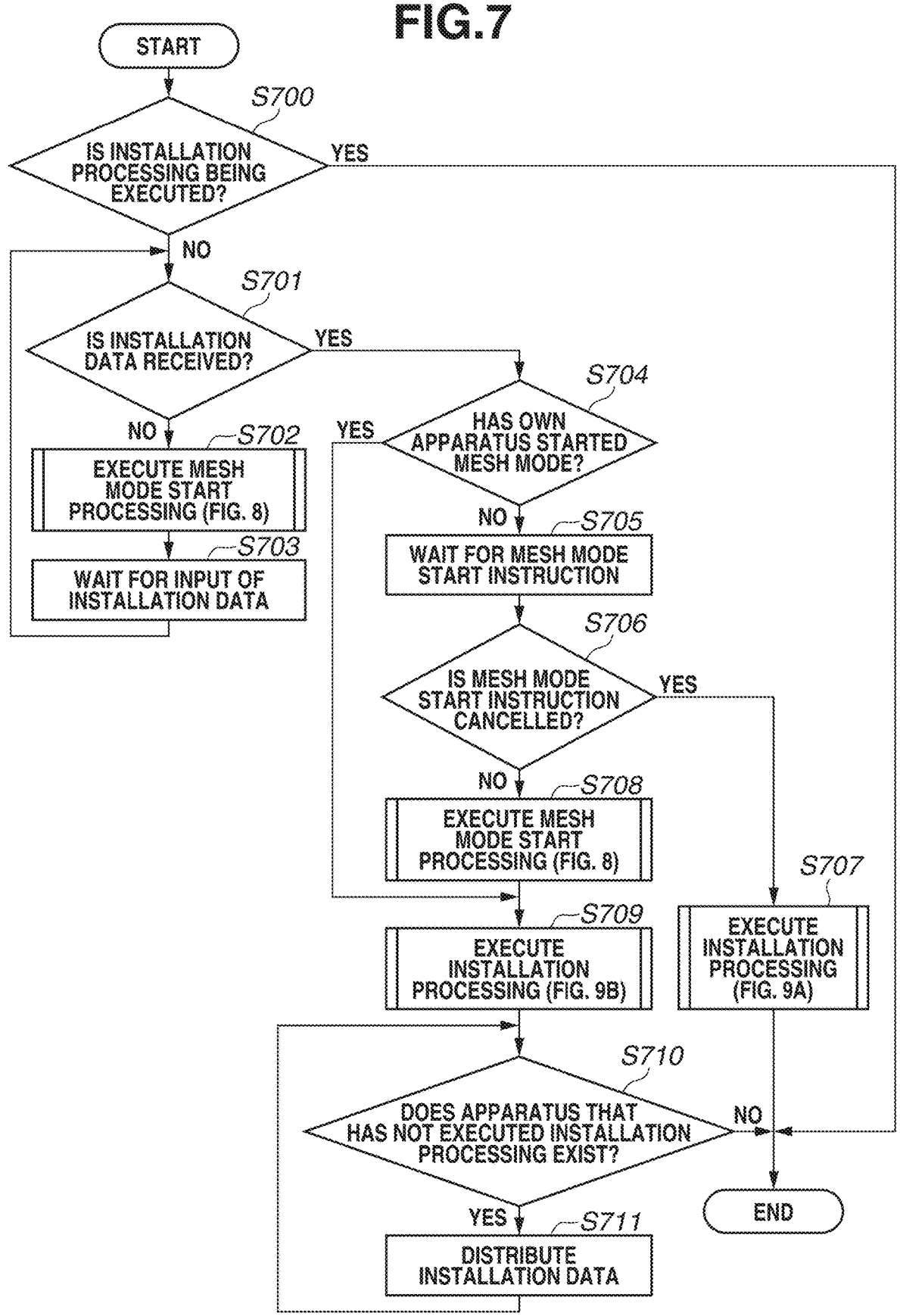
FIG. 7 is a flowchart illustrating an entirety of processing of an automatic installation support function.

FIG. 7 is a flowchart illustrating the entire processing relating to installation of the support function 350. The processing is realized by the CPU 210 of the network device (image processing apparatus 101) as an installation target executing a program relating to the support function 350.

After the image processing apparatus 101 activates the support function 350, the processing is started by the operator inputting the mesh mode start instruction or performing connection of the USB storage 204 as a trigger.

In step S700, the processing execution unit 353 determines whether the image processing apparatus 101 that has started the processing is currently executing the installation processing. For example, the processing execution unit 353 may determine whether the processing is being executed based on presence or absence of a progress file created during the installation processing or may determine whether the processing is being executed based on the on/off state of a flag internally managed by a memory. If the installation processing is being executed (YES in step S700), the processing is ended, and installation processing that is being executed is continued. If the installation processing is not being executed (NO in step S700), the processing proceeds to step S701.

In step S701, the processing execution unit 353 determines whether data is received from the network I/F-2 214 or the storage management unit 352. The processing execution unit 353 further determines whether the received data is the mesh mode start instruction or the installation data. If the processing execution unit 353 determines that the mesh mode start instruction is received (NO in step S701), the processing proceeds to step S702. If the processing execution unit 353 determines that the installation data is received (YES in step S701), the processing proceeds to step S704. The installation data is received via the USB storage 204 or the network I/F-2 214.

In step S702, processing of starting the mesh mode is executed by the support function 350 (described below with reference to FIG. 8).

In step S703, the processing execution unit 353 waits for an input of the installation data. In this step, the processing execution unit 353 waits for the operator to connect the USB storage 204, or waits for the leader 101a or the sub-leader 101b which has completed the installation processing to distribute the installation data.

In step S704, the processing execution unit 353 determines whether own apparatus has started the mesh mode. If own apparatus has started the mesh mode (YES in step S704), the processing proceeds to step S709. If own apparatus has not started the mesh mode (NO in step S704), the processing proceeds to step S705. In a case where the processing proceeds to step S705, it is assumed that the USB storage 204 is connected thereto before the operator performs the operation described with reference to FIG. 11A.

In step S705, the processing execution unit 353 waits for the mesh mode start instruction from the user. During this step, a message may be displayed on the display unit of the image processing apparatus 101 in order to prompt the operator to transmit the mesh mode start instruction (see FIG. 11A) from a mobile terminal of the operator via the NFC. Further, a UI (not illustrated) that prompts the operator to input the mesh group ID or the mesh mode start instruction may be displayed on the operation unit 201. In step S706, the processing execution unit 353 determines whether the mesh mode start instruction is cancelled. If the mesh mode start instruction is cancelled (YES in step S706), the processing proceeds to step S707. If the mesh mode start instruction is received (NO in step S706), the processing proceeds to step S708.

In step S707, the installation processing (described below with reference to FIG. 9A) is executed by the support function 350 based on the installation data stored in the USB storage 204.

In step S708, processing for starting the mesh mode similar to the processing in step S702 (described below with reference to FIG. 8) is executed.

In step S709, the installation processing (described below with reference to FIG. 9B) of the network device as participating in the mesh group is executed by the support function 350.

In step S710, the processing execution unit 353 checks whether the image processing apparatus 101 that has not executed the installation processing exists in the established mesh group. If own apparatus is not the leader 101a of the mesh group, the processing execution unit 353 executes the checking processing by making an inquiry to the leader 101a. Then, as a result of the inquiry, if the image processing apparatus 101 that has not completed the installation processing exists (YES in step S710), the processing proceeds to step S711. If the image processing apparatus 101 that has not completed the installation processing does not exist (NO in step S710), the processing is ended.

In addition, the checking processing in step S710 may be determined by the leader 101a or own apparatus. For example, if the above determination is made by the leader 101a, the processing execution unit 353 notifies the leader 101a of a list of image processing apparatuses 101 communicable by own apparatus to cause the leader 101a to make the determination based thereon. Further, if the above determination is made by own apparatus, the processing execution unit 353 acquires a list of members including the installation state of the mesh group from the leader 101a, and selects an image processing apparatus 101 as a distribution target from the image processing apparatuses 101 communicable by own apparatus and the list of members.

In step S711, the processing execution unit 353 distributes the installation data to the image processing apparatus 101 as a distribution target that has not completed the installation processing via the network I/F-2 214. If own apparatus is not the leader 101a, the processing execution unit 353 operates as a sub-leader 101b to distribute the installation data.

In addition, in step S711, the processing execution unit 353 acquires the script 513 of the image processing apparatus 101 as a distribution target from the leader 101a, and requests the script management unit 354 to analyze the script 513. According to the analysis result, the processing execution unit 353 distributes the required installation data to the image processing apparatus as a distribution target. Further, a storage destination of the installation data of the script 513 of the image processing apparatus 101 as a distribution target, e.g., a tag <relativeDirPath> of the setting data processing portion 606, may be rewritten, and the data may be acquired from the storage destination of the distribution target. For example, a data storage folder for the mesh mode is prepared, and a fixed location thereof or only a fixed link name thereof may be specified.

The installation data distributed in the above processing is data necessary for the target device to execute the installation processing, e.g., a file of the common setting value retained by own apparatus. If own apparatus does not retain the installation data of the distribution target, the processing execution unit 353 directly acquires the installation data from the leader 101a or via the sub-leader 101b, and distributes the installation data to the image processing apparatus 101 as a distribution target after storing the installation data in own apparatus. Further, an acquisition timing of the installation data of the distribution target is not limited to a timing at which the installation data is necessary, and the installation data may be previously acquired at a timing at which the processing execution unit 353 checks with the leader 101a about existence of the image processing apparatus 101 on which the installation processing has not been executed. Furthermore, if the installation data is to be acquired previously, the installation data of a plurality of image processing apparatuses 101 may be acquired according to a capacity thereof, or the installation data to be acquired may be dynamically changed according to a distance between the image processing apparatuses 101 or the communication speed.

Figure 8:
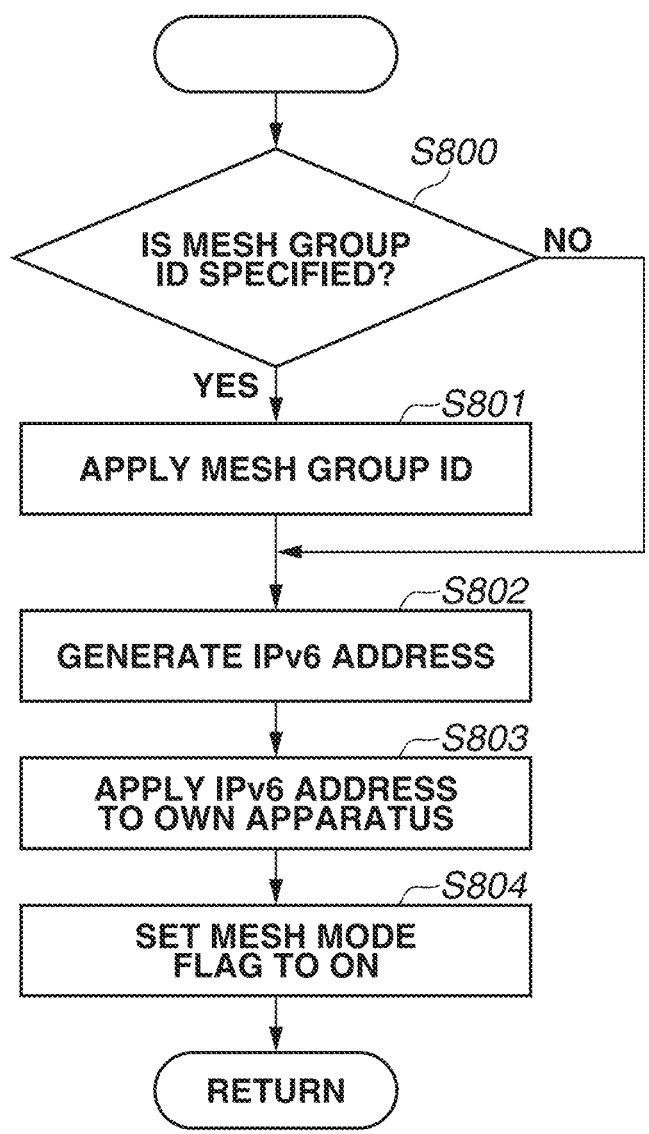
FIG. 8 is a flowchart illustrating a detail of mesh mode start processing.

FIG. 8 is a flowchart illustrating details of the mesh mode start processing executed in steps S702 and S708. Through the processing, the network devices as installation targets respectively start the mesh mode to establish or participate in the mesh network.

In step S800, the processing execution unit 353 determines whether the mesh group ID is specified concurrently with an input of the mesh mode start instruction. If the mesh group ID is not specified (NO in step S800), the processing proceeds to step S802, and if the mesh group is specified (YES in step S800), the processing proceeds to step S801. In step S801, the processing execution unit 353 applies the mesh group ID that is specified concurrently with the input of the mesh mode start instruction to the image processing apparatus 101.

In step S802, the processing execution unit 353 generates an IPv6 address necessary for using the mesh network from a media access control (MAC) address. For example, a stateless automatic setting may be employed as the generation method. In step S803, the processing execution unit 353 applies the IPv6 address generated in step S802 to own apparatus. In step S804, the processing execution unit 353 sets a flag indicating that own apparatus is operating in the mesh mode to ON. In addition, a method without using a flag can be also used as long as the operation state of the mesh mode can be checked thereby. The processing execution unit 353 can participate in the mesh network through authentication processing or negotiation with a router device in the mesh network.

The processing of establishing and participating in the mesh network has been described as the above. The processing illustrated in FIG. 8 is an example of prior-processing for enabling the network device to use the mesh network, and all or a part of the processing may be omitted if the function is operable even though the support function 350 does not execute the setting. For example, the mesh network may be usable by simply setting the mesh mode flag to ON in step S804. Further, if the image processing apparatus 101 has to be reactivated in order to apply the setting of the processing, reactivation processing may be added as necessary.

Figure 9A:
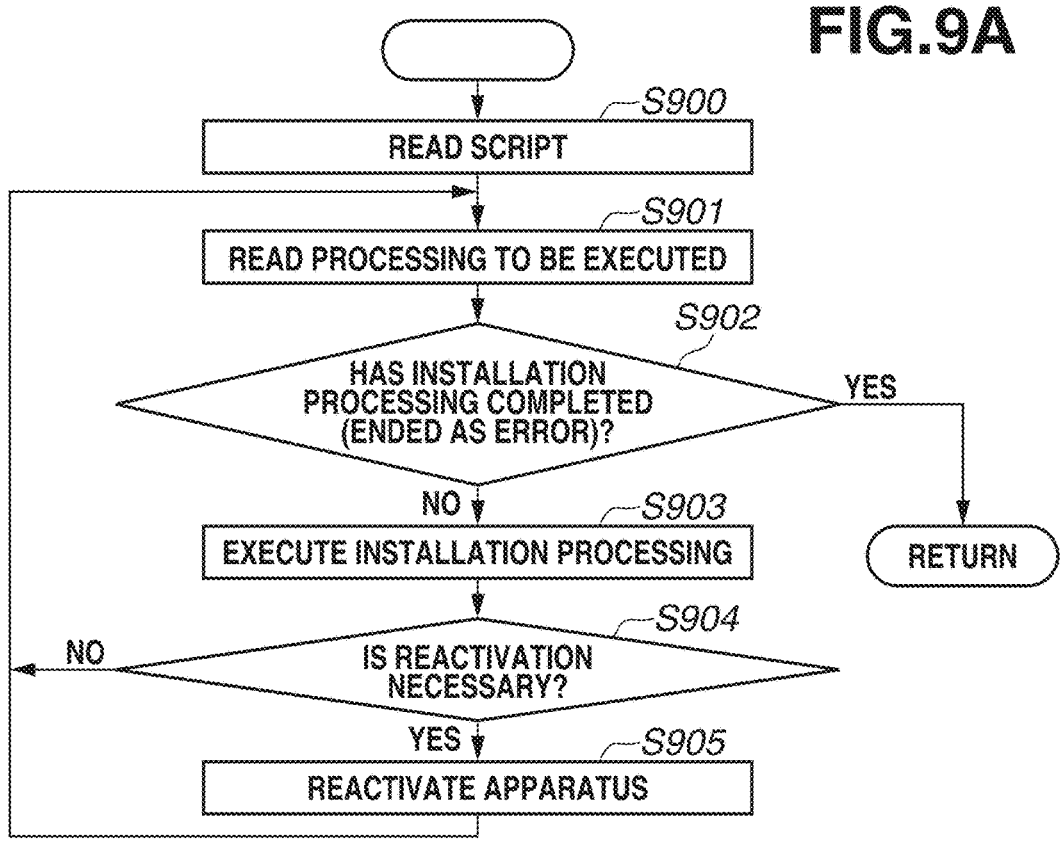
FIGS. 9A and 9B are flowcharts illustrating a detail of installation processing.
Figure 9B:
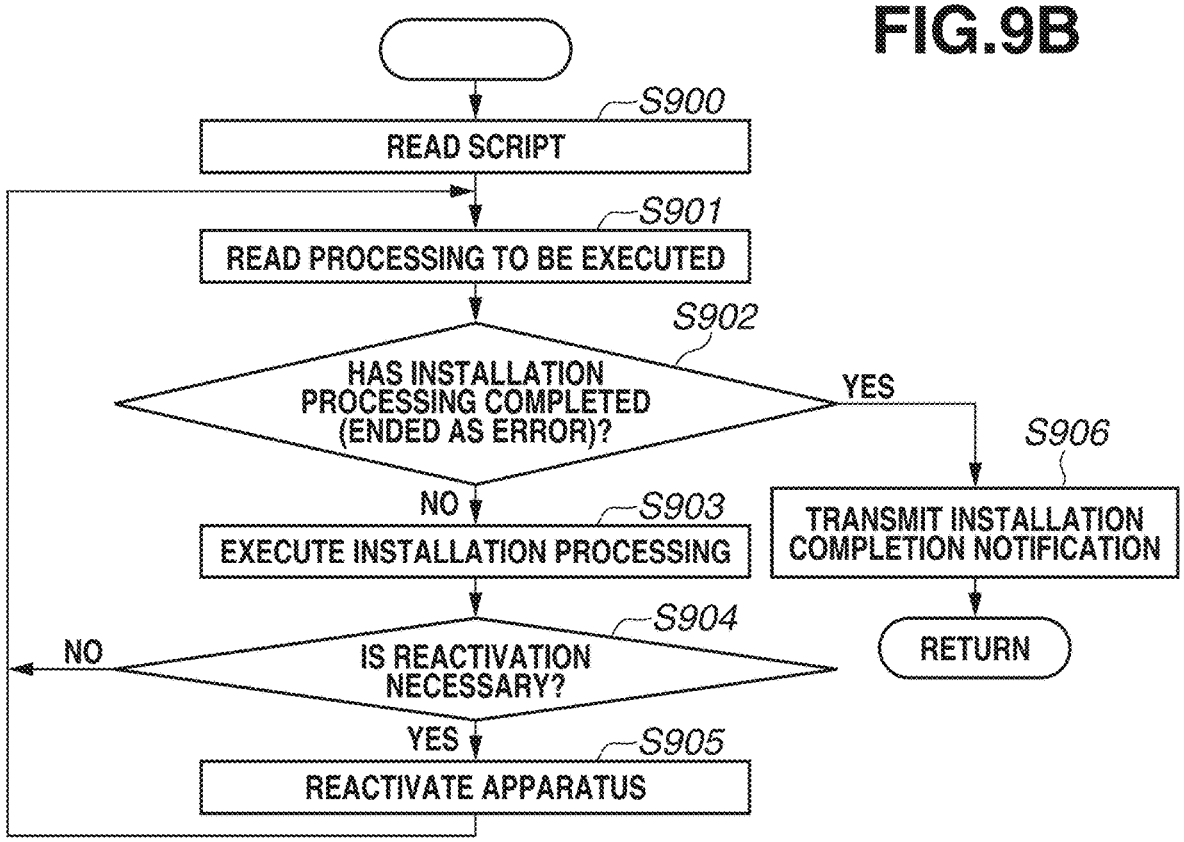

FIGS. 9A and 9B are flowcharts illustrating details of the installation processing for applying the installation data to own apparatus in steps S707 and S709.

FIG. 9A illustrates processing of applying the installation data acquired from the USB storage 204 without establishing the mesh network.

In step S900, the processing execution unit 353 requests the script management unit 354 to analyze the script 513 as an instruction of the installation processing and reads the analysis result in the RAM 213. In step S901, the processing execution unit 353 reads processing to be executed next from among the group of installation processing read in step S900. In step S902, the processing execution unit 353 determines whether the installation processing read in step S900 has been completed entirely (or, ended as an error). Although it is assumed that the processing execution unit 353 makes a determination on whether processing to be executed next exists in step S901 or whether the previous processing result is ended as an error, the determination processing is not limited thereto. If the processing execution unit 353 determines that the installation processing has been completed entirely (YES in step S902), the processing returns to FIG. 7, and the installation processing with respect to own apparatus is completed. At this time, a completion of the installation processing may be displayed on the operation unit 201. Further, in step S902, if the processing execution unit 353 determines that the installation processing has not been completed entirely and that the processing to be executed next still exists (NO in step S902), the processing proceeds to step S903.

In step S903, the processing execution unit 353 executes processing of actually applying the installation data to the image processing apparatus 101. In this processing, for example, the installation data described in the script 513 is acquired from the USB storage 204.

As a result of execution of the installation processing in step S903, in step S904, the processing execution unit 353 determines whether a system of the image processing apparatus 101 has to be reactivated in order to apply the installation data. If the processing execution unit 353 determines that reactivation is necessary (YES in step S904), the processing proceeds to step S905. If the processing execution unit 353 determines that reactivation is not necessary (NO in step S904), the processing proceeds to step S901. In step S905, the processing execution unit 353 records the progress of the installation processing and reactivates the image processing apparatus 101. For example, the progress of the installation processing may be recorded as a file in a format of the data1.dat 406. After the reactivation in step S905, the processing execution unit 353 reads the script 513 and the progress, and the processing returns to step S901 again.

FIG. 9B illustrates processing of applying the installation data via the mesh network which is executed by the image processing apparatus 101 participating in the mesh group. Particularly, processing illustrated in step S906 is added to the processing illustrated in FIG. 9A. The same step number is applied to the processing similar to the processing illustrated in FIG. 9A, and description thereof will be omitted.

In addition, in step S903 in FIG. 9B, the processing execution unit 353 can use the installation data received from another image processing apparatus 101 via the mesh network. Further, progress of reflecting the setting value included in the installation data is recorded by creating a temporary file within the image processing apparatus 101.

In step S906, the processing execution unit 353 notifies the leader 101a about the completion of the entire installation processing as the installation state via the result management unit 355. The installation state includes "completed" and "error ending". In the notification processing, it is sufficient if the final processing result is notified to the leader 101a. So, the processing result may be directly notified to the leader 101a or via the sub-leader 101b if the processing is executed via the sub-leader 101b. Further, if own apparatus is the leader 101a, the processing execution unit 353 updates the installation state managed by its own apparatus or simply completes the processing without executing anything. The notification with respect to the leader 101a is executed by using address information of the leader 101a of the network of the mesh group to which own apparatus belongs.

Further, in step S906 described above, it is assumed that the processing execution unit 353 notifies the leader 101a about the installation state via the mesh network. However, if the installation data has been applied entirely and the installation processing has been completed, it is possible to perform communication using the network I/F-1 213 via the existing network such as the LAN. Accordingly, the processing execution unit 353 may notify the distribution source of the installation data about the installation state (information indicating the completion) by using the network I/F-1 213. With this processing, connection of the existing network in the client environment can be also checked in addition to checking the completion of the installation processing.

FIG. 12 is a diagram illustrating an example of the checking screen of the installation state which the support function 350 of the leader 101a displays on the operation unit 201.

The information displayed in FIG. 12 is generated based on the notification of the installation state of the image processing apparatus 101 as an installation target managed by the leader 101a, i.e., the image processing apparatus 101 (member) communicable via the mesh network. Further, information about the image processing apparatus 101 managed by the leader 101a is acquired or notified from the member when the mesh network is established.

In the checking screen illustrated in FIG. 12, a list 1200 (hereinafter, "device list 1200") of image processing apparatuses 101 belonging to the mesh network group established for the installation operation is displayed. The device list 1200 consists of a serial number 1201, a model 1202, and an installation state 1203. The serial number 1201 describes an identifier for specifying the image processing apparatus 101 belonging to the mesh group. The model 1202 describes a model of the image processing apparatus 101 used for determining the usable installation data.

The installation state 1203 describes the installation state of the member, i.e., "UNDISTRIBUTED", "BEING INSTALLED", "COMPLETED", or "ERROR". "UNDISTRIBUTED" indicates a state where the installation data has not been distributed or installation has not been completed. The state "BEING INSTALLED" indicates a state where the installation data has been distributed although a state notification indicating the completion has not been received. The state "COMPLETED" indicates a state where the installation processing has been completed and the state notification has been received. Further, if the installation state is "COMPLETED", the member can be upgraded to a sub-leader to distribute the installation data to another member. The state of "ERROR" will be described below.

In addition, the installation state checking screen illustrated in FIG. 12 is merely an example, and another item to be displayed may be added if necessary, and the item may not have to be displayed if not necessary. For example, information that makes the leader or the sub-leader recognizable may be displayed. Further, the installation state checking screen may display another user interface (UI). For example, a detail button may be provided, so that the user can see a detailed installation state of the image processing apparatus 101 selected from the device list 1200.

The installation processing for applying the installation data to the image processing apparatus 101 has been described as the above. In addition, although the installation data described in the script 513 has been acquired in step S903, the exemplary embodiment is not limited thereto. For example, a specific folder for storing the installation data is prepared in the image processing apparatus 101, and the data stored in the specific data may be used. Further, in the notification processing with respect to the leader 101a, progress of the installation processing may be also notified thereto in addition to the completion of the installation processing notified in step S906.

In the method described in the first exemplary embodiment, the installation processing of all of the image processing apparatuses 101 as the installation targets is dynamically executed by establishing the mesh network and distributing the installation data through the installation processing of the image processing apparatuses 101. With this processing, the mesh network can be used even after the client has started the operation of the image processing apparatus 101.

However, depending on the convenience of the client or the sales company, there may be a case where the mesh network should not be used continuously. Thus, in a second exemplary embodiment, an example of a method of cancelling the mesh network established in the first exemplary embodiment will be described. In the present exemplary embodiment, FIGS. 1 to 9 are similar to those described in the first exemplary embodiment, and thus description thereof will be omitted. Further, in the present exemplary embodiment, it is assumed that the operator waits in front of the leader 101a, so that a mesh mode cancellation instruction is directly input to the leader 101a. In addition, the operator can also input the mesh mode cancellation instruction to the leader 101a from another network device in the mesh group via the mesh network.

Figure 13A:
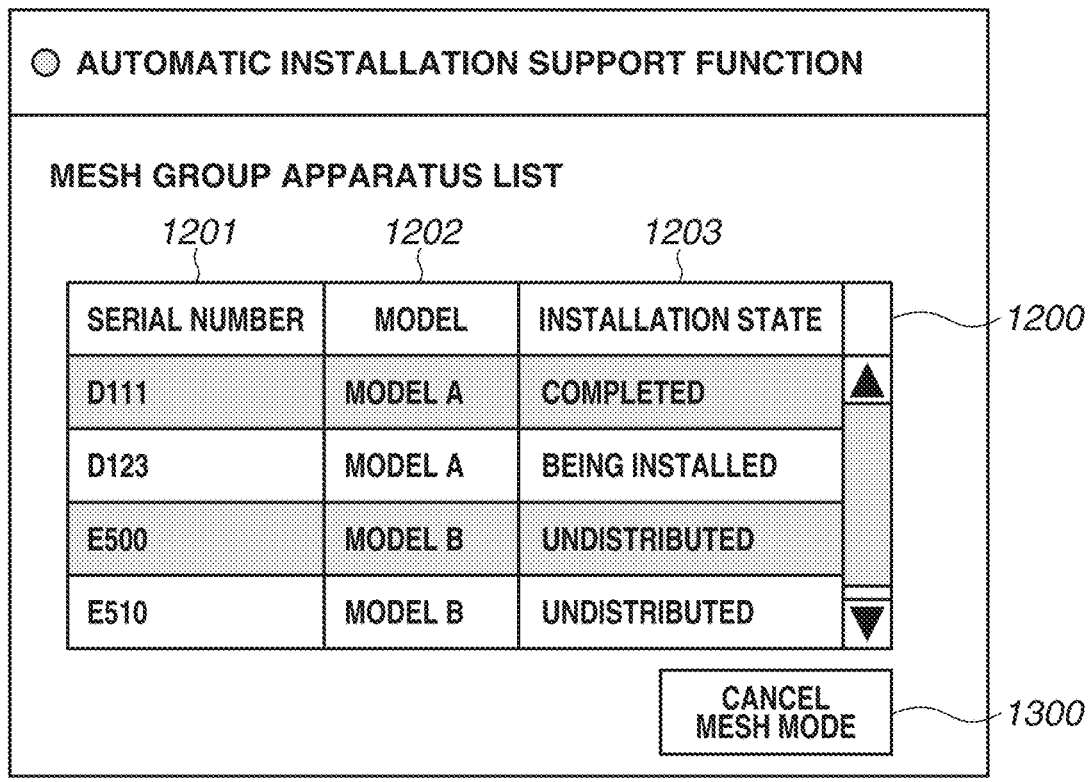
FIGS. 13A and 13B are diagrams illustrating examples of screens for inputting a mesh mode cancellation instruction according to a second exemplary embodiment.
Figure 13B:
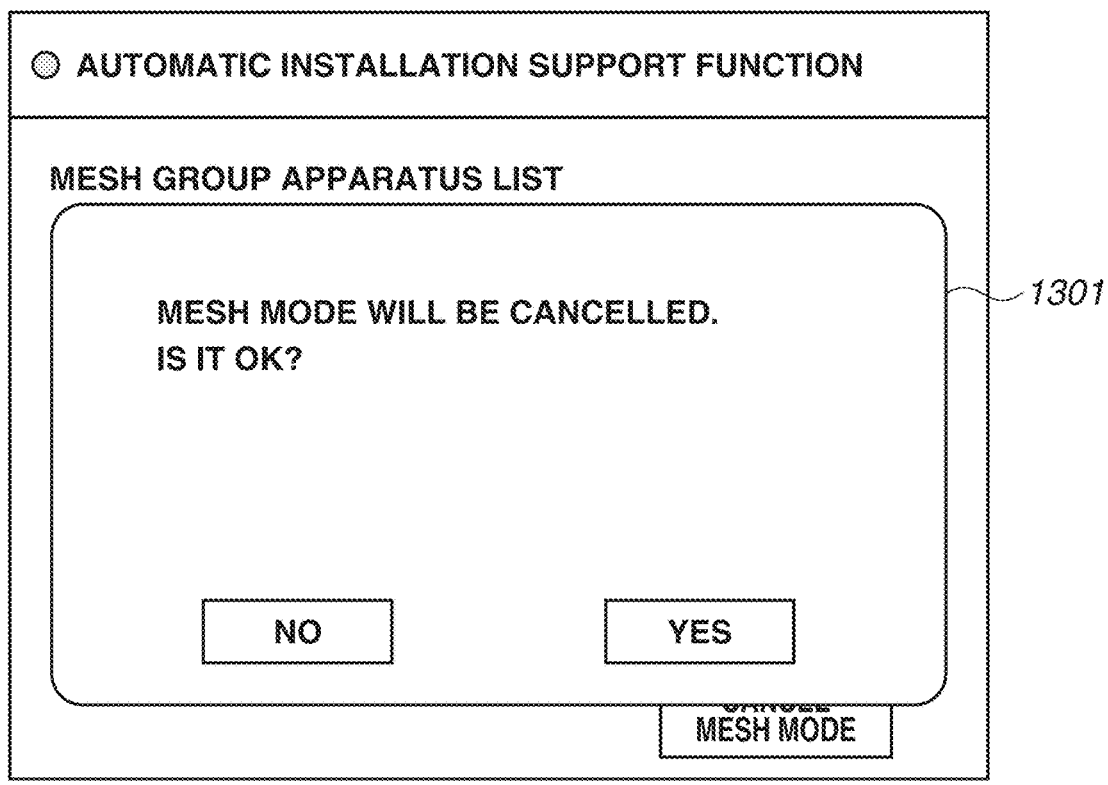

FIGS. 13A and 13B are diagrams illustrating examples of screens for inputting the mesh mode cancellation instruction displayed on the operation unit 201 by the leader 101a.

FIG. 13A illustrates an expansion screen of the installation state checking screen illustrated in FIG. 12, and a mesh mode cancellation button 1300 is added thereto.

The mesh mode cancellation button 1300 as a trigger via which the user inputs the mesh mode cancellation instruction. A dialogue illustrated in FIG. 13B is displayed when the mesh mode cancellation button 1300 is pressed.

FIG. 13B is a diagram illustrating a confirmation dialogue 1301 before the user inputs the mesh mode cancellation instruction. If the user presses a YES button at the confirmation dialogue 1301, the support function 350 of the leader 101a transmits the mesh mode cancellation instruction to all of the members including the sub-leader 101b. If the user presses a NO button, the mesh mode cancellation instruction is stopped.

FIG. 10 is a flowchart illustrating deletion of the mesh network executed by the support function 350, i.e., processing of cancelling the mesh mode. The processing is realized by the CPU 210 of the network device (image processing apparatus 101) as an installation target executing a program relating to the support function 350.

This processing is started when the operator inputs the mesh mode cancellation instruction via the screens displayed on the operation unit 201 (FIGS. 13A and 13B).

In step S1000, the processing execution unit 353 checks the installation state managed by the leader 101a and determines whether the installation processing of all of the members has been completed. If the installation processing of all of the members has been completed (YES in step S1000), the processing proceeds to step S1001. If the installation processing thereof has not been completed (NO in step S1000), the processing is ended.

In step S1001, the processing execution unit 353 transmits the mesh mode cancellation instruction to all of the image processing apparatuses 101 as the members included in the mesh group. Through the processing, the image processing apparatuses 101 as the members disable the mesh mode (i.e., set the mesh mode flag to OFF). Herein, a setting of the IPv6 address generated in the processing illustrated in FIG. 8 is cancelled. The leader 101a disables its own mesh mode after all of the members are not communicable via the mesh network.

Further, in the flowchart illustrated in FIG. 10, although the cancellation instruction input by the operator via the UI illustrated in FIG. 13 is taken as a trigger, the leader 101a may automatically transmits the cancellation instruction to all of the members when completion of the installation processing is detected with respect to all of the members.

Further, in the above-described exemplary embodiment, as an example of processing of disabling the mesh network used for the installation processing, the mesh network itself has been deleted by disabling the mesh mode and deleting the parameter of the mesh network through the mesh mode cancellation instruction. However, the purpose of the present exemplary embodiment can be achieved through a method of making the mesh mode unusable by only disabling the mesh mode instead of executing the above-described processing.

In the above-described exemplary embodiment, the operator can check whether the installation processing of the image processing apparatus 101 has been completed via the operation unit 201 of the image processing apparatus 101. On the other hand, in a case where the installation processing is ended with an error, there is a case where the operator would like to check the error ending by using the installation state checking screen. For example, if the installation processing is ended with an error, the operator would like to perform recovery processing on only a corresponding image processing apparatus 101 by using the data stored in the USB storage 204 through the processing illustrated in FIG. 9A without using the mesh network. Thus, in a third exemplary embodiment, a method of checking a state of the error ending of the installation processing will be described more specifically.

In the present exemplary embodiment, FIGS. 1 to 9 are similar to those described in the first exemplary embodiment, and thus description thereof will be omitted. Further, in the present exemplary embodiment, it is assumed that the operator waits in front of the leader 101a.

FIG. 14 is a diagram illustrating an example of the installation state checking screen displayed on the leader 101a. In FIG. 14, an installation site 1400 is added to the device list 1200 illustrated in FIG. 12. Further, respective elements 1200 to 1202 are similar to those illustrated in the installation state checking screen illustrated in FIG. 12, so that description thereof will be omitted.

The installation site 1400 describes a position where the operator arranges the image processing apparatuses 101, and a value input to the installation site input portion 1103 in FIG. 11A is displayed when the mesh mode start instruction is input thereto. In addition, the installation site 1400 may be managed as a part of the setting value of the image processing apparatus 101, and the value may be notified to the leader 101a and rewritten if the value has been changed by the installation processing.

Items such as "ERROR", "NETWORK FAILURE", and "TIME-OUT" which indicate failures of the installation processing are displayed on the installation state 1401 in addition to the items displayed on the installation state 1203 in FIG. 12.

Figure 15:
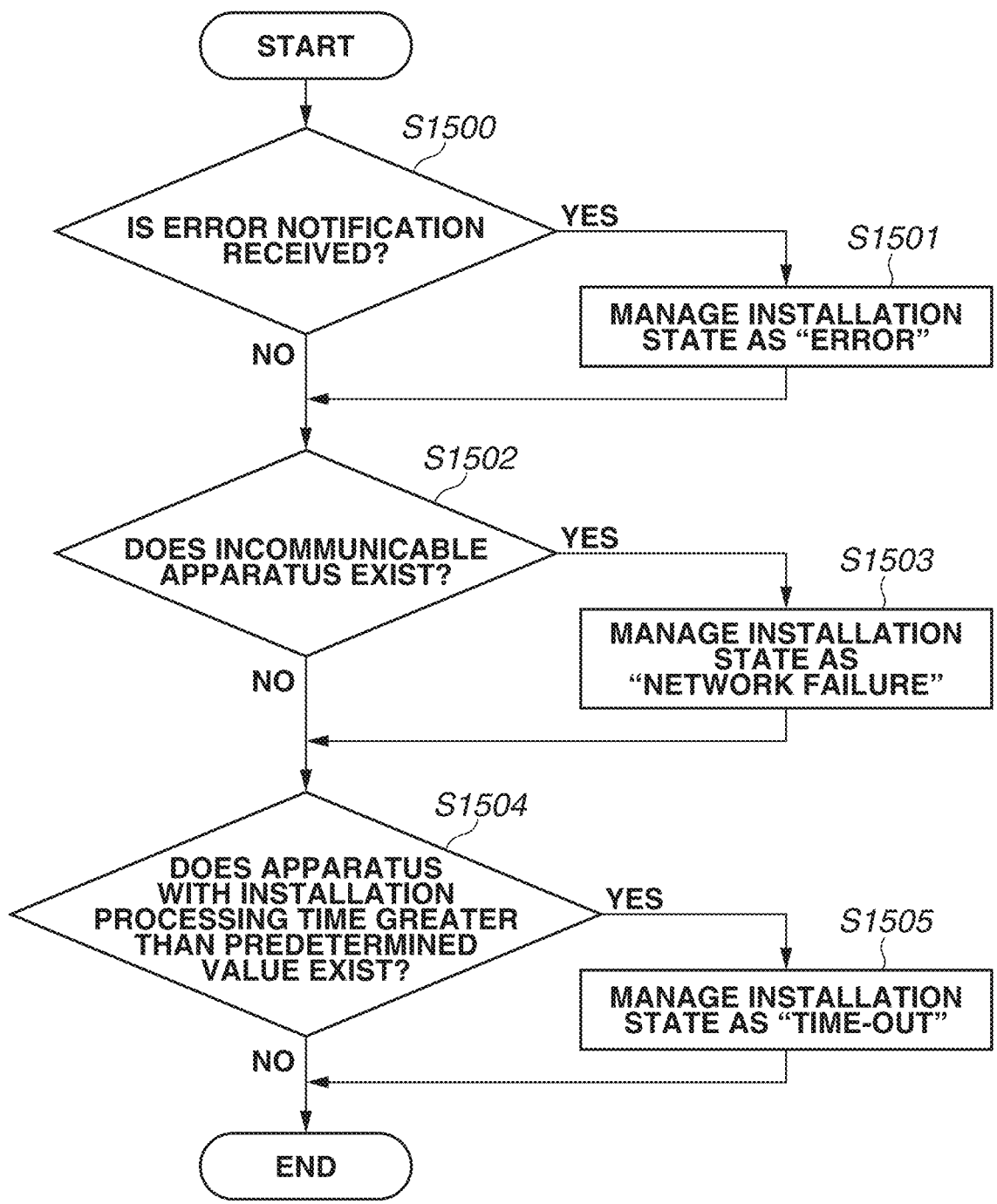
FIG. 15 is a flowchart illustrating processing of determining abnormality of an installation state according to the third exemplary embodiment.

FIG. 15 is a flowchart illustrating the processing of determining whether abnormality such as an error ending arises in the installation state, executed by the support function 350. The processing is realized by the CPU 210 of the network device as an installation target (e.g., leader 101a) executing a program relating to the support function 350. This processing is repeatedly executed after the support function 350 is activated, and the processing is ended when the support function 350 is stopped.

In step S1500, the processing execution unit 353 determines whether the state notification indicating the error ending is received from the member. If the notification about the error ending is received (YES in step S1500), the processing proceeds to step S1501. If the notification is not received (NO in step S1500), the processing proceeds to step S1502. In step S1501, the processing execution unit 353 manages the installation state of the member that transmits the state notification indicating the error ending as "ERROR", and reflects the installation state on the checking screen in FIG. 14.

In step S1502, the processing execution unit 353 determines whether a member that is not communicable via the mesh network is newly detected from among the members which the leader 101a manages the installation states. If the incommunicable member is newly detected (YES in step S1502), the processing proceeds to step S1503. If the incommunicable member is not detected (NO in step S1502), the processing proceeds to step S1504. In step S1503, the processing execution unit 353 manages the installation state of the corresponding member as "NETWORK FAILURE (i.e., INCOMMUNICABLE)" and reflects the installation state on the checking screen illustrated in FIG. 14.

In step S1504, the processing execution unit 353 compares time (installation processing time) elapsed after distribution of the installation data with a predetermined value indicating installation processing estimation time defined previously at each member, and determines whether any member having the installation processing time exceeding the predetermined value exists. If the member having the installation processing time exceeding the predetermined value exists (YES in step S1504), the processing proceeds to step S1505. If the member having the installation processing time exceeding the predetermined value does not exist (NO in step S1504), the processing is ended. In step S1505, the processing execution unit 353 manages the installation state of the corresponding member as "TIME-OUT", and reflects the installation state on the checking screen illustrated in FIG. 14. In addition, the predetermined value used for the determination in step S1504 may be determined dynamically based on an average value of the installation time of a plurality of members the installation processing has been completed.

Further, if the member having an error can recover from the error automatically, a notification of recovery or normal ending can be transmitted from the member at a timing of recovery. In this case, the processing execution unit 353 may update the installation state checking screen according to the received notification. Similarly, if the member that has not been communicable becomes communicable, the processing execution unit 353 may update the installation state checking screen at a timing at which the member has become communicable.

In FIG. 15, although the support function 350 repeatedly executes the processing, the exemplary embodiment is not limited thereto, and the processing may be executed when a changing event of the installation state (e.g., receipt of a notification from the member or detection of a network failure).

As described above, according to the present exemplary embodiment, the operator can check the abnormality arising in the installation processing of the member together with the installation site of that member via the operation screen of the leader 101a. With this configuration, the operator can instantly perform a recovery operation of the installation processing.

Application Example

In the first to the third exemplary embodiments, it is assumed that the checking screen illustrated in FIGS. 12 to 14 is provided on the operation screen of the leader 101a.

Herein, the checking screen illustrated in FIGS. 12 to 14 can be displayed on the operator's mobile terminal by making the mobile terminal owned by the operator participate in the mesh group. In this case, the application of the mobile terminal which provides the screens illustrated in FIGS. 11A and 11B acquires the screen information from the leader 101a. Further, in place of the leader 101a, the application may provide the checking screen by receiving the state notification from all of the members including the leader 101a.

Furthermore, the installation state checking screen can be displayed on the operator's mobile terminal by making the mobile terminal directly communicate via the network I/F-2 214 of the leader 101a.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-027293, filed Feb. 16, 2017, which is hereby incorporated by reference herein in its entirety.

What is claimed is:
1. A network device comprising:
a memory storing instructions; and
a processor which executes the instructions causing the network device to:
receive an input of data including a setting value required for use of the network device in an environment in which the network device is arranged, wherein the input data includes setting for connecting to an existing network that exists in the environment;
activate a mode for participating in a mesh network identified by identification information specified previously, by using a wireless communication function, wherein the mesh network is different from the existing network;
distribute the input data to a network device other than the own network device via the mesh network without the existing network;
receive, via the mesh network or the existing network, a result of application of the distributed data from a network device to which the data is distributed, and
disable the activated mode after the result of application of the distributed data has been received.

2. The network device according to claim 1, wherein the instructions further cause the network device to execute application of the input data to the own network device.

3. The network device according to claim 1, wherein the instructions further cause the network device to provide information indicating a state including the received result of the application.

4. The network device according to claim 1, wherein the instructions further cause the network device to provide the information indicating the state including the received result of the application together with information indicating a network device and an installation site of the network device.

5. The network device according to claim 3, wherein the information indicating the state includes at least any one of states of "completed", "undistributed", "error", "time-out", and "incommunicable".

6. The network device according to claim 1, wherein the instructions further cause the network device to transmit, after distributing the data, an instruction for deleting the mesh network to a network device participating in the mesh network.

7. A network device comprising:
a memory storing instructions; and
a processor which executes the instructions causing the network device to:
activate a mesh mode for participating in a mesh network identified by identification information specified previously, by using a wireless communication function;
receive data to be applied to the own network device via the mesh network, wherein the received data includes settings for connecting to an existing network that exists in an environment in which the own network device is arranged;
execute application of the received data; and
transmit a result of the application to a distribution source of the data via the mesh network or the existing network that is different from the mesh network; and
disable the activated mesh mode according to an instruction received from the distribution source.

8. The network device according to claim 7, wherein the result of the application includes information indicating a completion of the application or an error ending of the application.

9. The network device according to claim 7, wherein the instructions further cause the network device to distribute the received data to a network device, from among network devices participating in the mesh network, to which data to be applied has not been applied.

10. A method for a network device, the method comprising:
receiving an input of data including a setting value required for use of the network device in an environment in which the network device is arranged, wherein the input data includes setting for connecting to an existing network that exists in the environment;
activating a mode for participating in a mesh network identified by identification information specified previously, by using a wireless communication function, wherein the mesh network is different from the existing network;
distributing the input data to a network device other than the own network device via the mesh network without the existing network;
receiving, via the mesh network or the existing network, a result of application of the distributed data from a network device to which the data is distributed; and
disabling the activated mode after the result of application of the distributed data has been received.

11. The method according to claim 10, further comprising executing application of the input data to the own network device.

12. The method according to claim 10, further comprising transmitting, after distributing the data, an instruction for deleting the mesh network to a network device participating in the mesh network.

13. A method for a network device, the method comprising:
activating a mesh mode for participating in a mesh network identified by identification information specified previously, by using a wireless communication function;
receiving data to be applied to the own network device via the mesh network, wherein the received data includes settings for connecting to an existing network that exists in an environment in which the own network device is arranged;
executing application of the received data; and
transmitting a result of the application to a distribution source of the data via the mesh network or the existing network that is different from the mesh network; and
disabling the activated mesh mode according to an instruction received from the distribution source.

14. The method according to claim 13, further comprising distributing the received data to a network device, from among network devices participating in the mesh network, to which data to be applied has not been applied.

15. A non-transitory computer-readable storage medium storing a computer program for making a computer execute a method for a network device, the method comprising:
receiving an input of data including a setting value required for use of the network device in an environment in which the network device is arranged, wherein the input data includes setting for connecting to an existing network that exists in the environment;
activating a mode for participating in a mesh network identified by identification information specified previously, by using a wireless communication function, wherein the mesh network is different from the existing network;
distributing the input data to a network device other than the own network device via the mesh network without the existing network; and
receiving, via the mesh network or the existing network, a result of application of the distributed data from a network device to which the data is distributed; and
disabling the activated mode after the result of application of the distributed data has been received.

16. A non-transitory computer-readable storage medium storing a computer program for making a computer execute a method for a network device, the method comprising:
activating a mesh mode for participating in a mesh network identified by identification information specified previously, by using a wireless communication function;
receiving data to be applied to the own network device via the mesh network, wherein the received data includes settings for connecting to an existing network that exists in an environment in which the own network device is arranged;
executing application of the received data; and
transmitting a result of the application to a distribution source of the data via the mesh network or the existing network that is different from the mesh network; and
disabling the activated mesh mode according to an instruction received from the distribution source.

* * * * *